United States Patent
Zhu

(10) Patent No.: US 11,068,226 B2
(45) Date of Patent: Jul. 20, 2021

(54) DISPLAY METHOD AND APPARATUS

(71) Applicant: HUAWEI TECHNOLOGIES CO., LTD., Shenzhen (CN)

(72) Inventor: Dengkui Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/619,857

(22) PCT Filed: Jun. 9, 2017

(86) PCT No.: PCT/CN2017/087818
§ 371 (c)(1),
(2) Date: Dec. 5, 2019

(87) PCT Pub. No.: WO2018/223400
PCT Pub. Date: Dec. 13, 2018

(65) Prior Publication Data
US 2020/0210135 A1    Jul. 2, 2020

(51) Int. Cl.
*G06F 3/14* (2006.01)
*H04M 1/72409* (2021.01)

(52) U.S. Cl.
CPC .......... *G06F 3/1454* (2013.01); *G06F 3/1423* (2013.01); *H04M 1/72409* (2021.01); *H04M 2250/16* (2013.01)

(58) Field of Classification Search
None
See application file for complete search history.

(56) References Cited

U.S. PATENT DOCUMENTS

| | | | |
|---|---|---|---|
| 9,519,452 B2 | 12/2016 | Hwang et al. |
| 2008/0231546 A1 | 9/2008 | Li |
| 2011/0006971 A1 | 1/2011 | Ebey et al. |
| 2012/0030584 A1 | 2/2012 | Bian |
| 2012/0036441 A1 | 2/2012 | Basir et al. |
| 2012/0081270 A1 | 4/2012 | Gimpl et al. |
| 2013/0162502 A1 | 6/2013 | Lee et al. |

(Continued)

FOREIGN PATENT DOCUMENTS

| CN | 100419848 C | 9/2008 |
|---|---|---|
| CN | 104202677 A | 12/2014 |
| CN | 104333650 A | 2/2015 |

(Continued)

*Primary Examiner* — Christopher J Kohlman
(74) *Attorney, Agent, or Firm* — Stein IP, LLC

(57) ABSTRACT

A display method and an apparatus that relates to the field of communications technologies, to avoid a problem that a process of a currently running application cannot continue due to disconnection of a terminal when the terminal performs multi-screen display. The method includes a first terminal sending first display data to a second terminal after the first terminal connects to the second terminal, so that the second terminal displays a first interface. In this case, the first terminal displays a second interface (the second interface is different from the first interface). The first terminal disconnects from the second terminal; and after the first terminal reconnects to the second terminal, the first terminal may send second display data to the second terminal, so that the second terminal displays a third interface correlated with the first interface.

21 Claims, 25 Drawing Sheets

(56) References Cited

U.S. PATENT DOCUMENTS

2013/0219303 A1* 8/2013 Eriksson ............. H04M 1/7253
  715/759
2016/0034059 A1   2/2016 Graf et al.

FOREIGN PATENT DOCUMENTS

| CN | 104581326 A | 4/2015 |
| CN | 104978156 A | 10/2015 |
| CN | 105022598 A | 11/2015 |
| CN | 105204804 A | 12/2015 |
| CN | 105426178 A | 3/2016 |
| CN | 106055327 A | 10/2016 |
| CN | 206226634 U | 6/2017 |
| EP | 2242240 A1 | 10/2010 |
| EP | 2706740 A1 | 3/2014 |
| GB | 2470658 A | 12/2010 |

* cited by examiner

Before disconnection

DISPLAY METHOD AND APPARATUS

CROSS-REFERENCE TO RELATED APPLICATIONS

This application is a national stage of International Application No. PCT/CN2017/087818, filed on Jun. 9, 2017, which is hereby incorporated by reference in its entirety.

TECHNICAL FIELD

Embodiments of this application relate to the field of communications technologies, and in particular, to a display method and an apparatus.

BACKGROUND

Using a mobile terminal as a personal computer (PC) is one significant way to implement mobile officing. Specifically, the mobile terminal such as a mobile phone can project display content on a screen of the mobile phone onto a large-screen display such as a large-screen display of a PC by using a wireless video display (Wi-Fi Display) function or a Microsoft™ continuum (continuum) function, so that the mobile phone can also be used as the PC after the mobile phone connects to the large-screen display.

After the mobile phone connects to the large-screen display, the mobile phone has two displays: one is a display of the mobile phone, and the other is the large-screen display of a large screen terminal connected to the mobile phone. The mobile phone may control the two displays to simultaneously display a same display interface, or may control the two displays to respectively run two independent display interfaces.

When the mobile phone disconnects from the large-screen display, a window of an application running on the large-screen display is forcibly closed. In addition, when the mobile phone reconnects to the large-screen display, a display interface on the large-screen display needs to be re-initialized, to show a desktop display interface on the large-screen display to a user.

SUMMARY

Embodiments of this application provide a display method and an apparatus, to avoid a technical problem that a process of a currently running application cannot continue upon reconnection due to disconnection of a terminal when the terminal performs multi-screen display.

To achieve the foregoing objectives, the embodiments of this application use the following technical solutions:

According to a first aspect, an embodiment of this application provides a display method, including the following: A first terminal sends first display data to a second terminal after the first terminal connects to the second terminal, so that the second terminal displays a first interface. In this case, the first terminal displays a second interface (the second interface is different from the first interface). The first terminal disconnects from the second terminal; and after the first terminal reconnects to the second terminal, the first terminal may send second display data to the second terminal, so that the second terminal displays a third interface correlated with the first interface. For example, an element in the third interface may be the same as an element in the first interface, so that a related interface that is displayed on the second terminal upon the previous disconnection is resumed in a display interface of the second terminal. In this way, an application seamlessly continues before and after the first terminal disconnects from the second terminal, thereby improving user experience in multi-screen display performed by a terminal.

In a possible design method, that the third interface is correlated with the first interface includes: an application displayed in the third interface is the same as an application displayed in the first interface; or an interface displayed in the third interface is the same as an interface displayed in the first interface; or an interface displayed in the third interface and an interface displayed in the first interface are adjacent interfaces of one application.

In a possible design method, when the application displayed in the third interface is the same as the application displayed in the first interface, the same application may be any one of a video application, a text application, an instant messaging application, or a game application.

In a possible design method, that an interface displayed in the third interface is the same as an interface displayed in the first interface may specifically include: video playback progress displayed in the third interface is the same as video playback progress displayed in the first interface, so that a video seamlessly continues before and after the first terminal disconnects from the second terminal; or document content displayed in the third interface is the same as document content displayed in the first interface, so that a document seamlessly continues before and after the first terminal disconnects from the second terminal; or a chat record in a chat window in the third interface is the same as a chat record in a chat window in the first interface, so that a communication process seamlessly continues before and after the first terminal disconnects from the second terminal; or a game system interface displayed in the third interface is the same as a game system interface displayed in the first interface, so that a game application seamlessly continues before and after the first terminal disconnects from the second terminal.

In a possible design method, the chat record includes an unsent chat draft in an input box. In this way, after the first terminal reconnects to the second terminal, a user does not need to re-enter the chat draft into the input box.

In a possible design method, when the interface displayed in the third interface and the interface displayed in the first interface are adjacent interfaces of one application, the method further includes: sending, by the first terminal, third display data to the second terminal in response to an operation triggered by a user, so that the second terminal switches from the third interface to the first interface. In this way, after the first terminal reconnects to the second terminal, the user needs to perform only one operation, to resume a related display interface that is originally displayed on the second terminal.

In a possible design method, a display location of a target application in the third interface is the same as a display location of the target application in the first interface, and the target application is a running application displayed in both the first interface and the third interface. In this way, a window of the target application is displayed at a same location on the second terminal before and after the disconnection, thereby further improving user experience in multi-screen display performed by a terminal.

In a possible design method, an application displayed in the third interface is the same as at least one of applications displayed in the first interface; or an application displayed in the third interface is a subset of applications displayed in the first interface; or applications displayed in the third interface are all the same as applications displayed in the first interface, and locations of the applications displayed in the third interface are the same as locations of the applications displayed in the first interface.

In a possible design method, after the first terminal disconnects from the second terminal, the method further includes: stopping, by the first terminal, sending the first display data to the second terminal; and displaying, by the first terminal, a fourth interface correlated with the third interface. To be specific, when the first terminal disconnects from the second terminal, the first terminal may switch from a related interface that is displayed on the second terminal at this time to a display interface of the first terminal, so that a user can still continue to perform a related function of the target application on the first terminal during the disconnection, thereby reducing impact, on an execution process of the target application, that is caused because the first terminal disconnects from the second terminal is reduced.

For example, an interface element in the fourth interface is the same as an interface element in the third interface.

In a possible design method, when the first terminal disconnects from the second terminal, the method further includes: recording, by the first terminal in a read-only memory (ROM), historical display data that is on the second terminal upon the disconnection, where the historical display data is used to indicate display content that is on the second terminal upon the disconnection. In this way, running status information recorded in the ROM is not lost even after the first terminal is powered off and powered on again. Therefore, after the first terminal reconnects to the second terminal, the first terminal may also resume, in the display interface of the second terminal based on the historical display data, the display content that is on the second terminal upon the disconnection.

According to a second aspect, an embodiment of this application provides a terminal, including a processor, a memory, a bus, and a communications interface The communications interface is configured to send first display data to another terminal after the terminal connects to the another terminal, so that the another terminal displays a first interface, where the terminal displays a second interface, and the first interface is different from the second interface; the processor is configured to instruct the terminal to disconnect from the another terminal; and the communications interface is further configured to send second display data to the another terminal after the terminal reconnects to the another terminal, so that the another terminal displays a third interface, where the third interface is correlated with the first interface.

In a possible design method, that the third interface is correlated with the first interface includes: an application displayed in the third interface is the same as an application displayed in the first interface; or an interface displayed in the third interface is the same as an interface displayed in the first interface; or an interface displayed in the third interface and an interface displayed in the first interface are adjacent interfaces of one application.

In a possible design method, when the application displayed in the third interface is the same as the application displayed in the first interface, and the same application is any one of a video application, a text application, an instant messaging application, or a game application.

In a possible design method, that an interface displayed in the third interface is the same as an interface displayed in the first interface includes: video playback progress displayed in the third interface is the same as video playback progress displayed in the first interface; or document content displayed in the third interface is the same as document content displayed in the first interface; or a chat record in a chat window in the third interface is the same as a chat record in a chat window in the first interface; or a game system interface displayed in the third interface is the same as a game system interface displayed in the first interface.

In a possible design method, the chat record includes an unsent chat draft in an input box.

In a possible design method, when the interface displayed in the third interface and the interface displayed in the first interface are adjacent interfaces of one application, the communications interface is further configured to send third display data to the another terminal, so that the another terminal switches from the third interface to the first interface.

In a possible design method, a display location of a target application in the third interface is the same as a display location of the target application in the first interface, and the target application is a running application displayed in both the first interface and the third interface.

In a possible design method, an application displayed in the third interface is the same as at least one of applications displayed in the first interface; or an application displayed in the third interface is a subset of applications displayed in the first interface; or applications displayed in the third interface are all the same as applications displayed in the first interface, and locations of the applications displayed in the third interface are the same as locations of the applications displayed in the first interface.

In a possible design method, the terminal further includes a display. The processor is further configured to stop sending the first display data to the another terminal by using the communications interface; and the display is configured to display a fourth interface correlated with the third interface.

In a possible design method, an interface element in the fourth interface is the same as an interface element in the third interface.

In a possible design method, the processor is further configured to record, in the memory, historical display data that is on the another terminal upon the disconnection, where the historical display data is used to indicate display content that is on the another terminal upon the disconnection.

According to a third aspect, an embodiment of this application provides a terminal, including: a communications unit, configured to connect to another terminal, so that the terminal and the another terminal can communicate with each other, a control unit, configured to: when the terminal disconnects from the another terminal, stop inputting first display data to the another terminal, so that a target application running in a display interface of the another terminal is closed; and a record unit, configured to record historical display data that is on the another terminal when the terminal disconnects from the another terminal, where the historical display data is used to indicate display content that is on the another terminal at this time. The communications unit is further configured to: when the terminal reconnects to the another terminal, obtain the historical display data and send second display data to the another terminal based on the historical display data, so that a window of the target application is resumed in the display interface of the another terminal.

According to a fourth aspect, an embodiment of this application provides a terminal, including a processor, a memory, a bus, and a communications interface. The memory is configured to store a computer execution instruction. The processor is connected to the memory by using the bus, and when the terminal runs, the processor executes the computer execution instruction stored in the memory, so that the terminal performs any one of the foregoing display methods.

According to a fifth aspect, an embodiment of this application provides a computer readable storage medium. The computer readable storage medium stores an instruction, and when the instruction runs on any one of the foregoing terminals, the terminal performs any one of the foregoing display methods.

According to a sixth aspect, an embodiment of this application provides a computer program product including an instruction. When the computer program product runs on any one of the foregoing terminals, the terminal performs any one of the foregoing display methods.

In the embodiments of this application, names of the foregoing terminals constitute no limitation on the devices. In actual implementation, these devices may appear in other names. The devices fall within the scope of the claims of this application and their equivalent technologies, provided that functions of the devices are similar to those in the embodiments of this application.

In addition, for technical effects brought by any one of the design manners in the second aspect to the sixth aspect, refer to technical effects brought by different design methods in the first aspect. Details are not described herein again.

DESCRIPTION OF EMBODIMENTS

The terms "first" and "second" in the following are merely intended for a purpose of description, and shall not be understood as an indication or implication of relative importance or implicit indication of a quantity of indicated technical features. Therefore, a feature restricted by "first" or "second" may explicitly indicate or implicitly include one or more such features. In the descriptions in the embodiments of this application, unless otherwise provided, "a plurality of" means two or more than two.

Figure 1A:
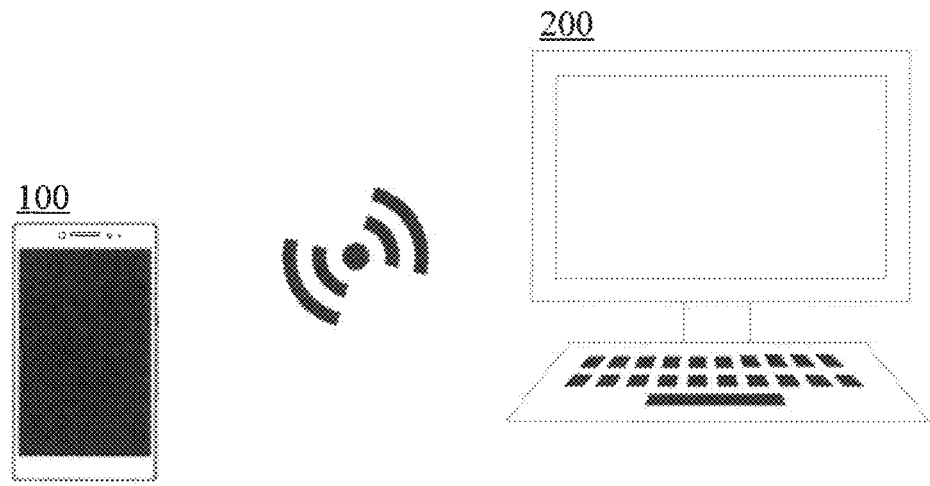
FIG. 1A and FIG. 1B are schematic diagrams of an application scenario of a display method according to an embodiment of this application.
Figure 1B:
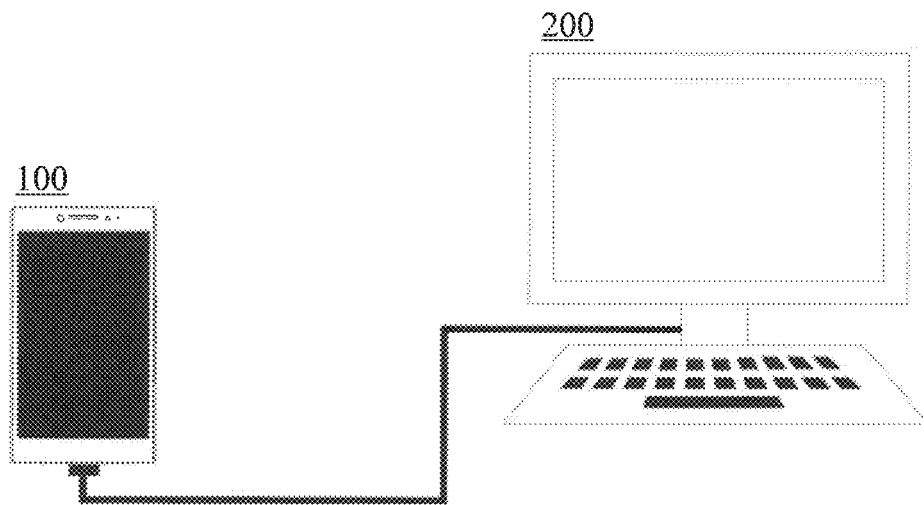

The embodiments of this application provide a display method. The method may be applied to mobile officing and another application scenario in which display data on a terminal needs to be displayed on a plurality of display screens. For example, as shown in FIG. 1A and FIG. 1B, a first terminal 100 may be a mobile phone, a second terminal 200 may be a desktop computer or a standalone display. As shown in FIG. 1A, the first terminal 100 may connect to the second terminal 200 in a wireless communication mode (for example, Wi-Fi); or as shown in FIG. 1B, the first terminal 100 may connect to the second terminal 200 in a wired communication mode (for example, a data cable). This is not limited in this embodiment of this application.

The first terminal 100 may serve as a controlling device, and the second terminal 200 may serve as a controlled device of the first terminal 100. After the first terminal 100 connects to the second terminal 200, it means that the first terminal 100 has two displays: one is a display of the first terminal 100, and the other is a display of the second terminal 200 connected to the first terminal 100.

In this embodiment of this application, after the first terminal 100 connects to the second terminal 200, the first terminal 100 may project, by using a homogenous display method or a heterogenous display method, an application installed on the first terminal 100 onto the display of the second terminal 200.

Homogenous display means that signal sources of display interfaces on different displays, such as the display of the first terminal 100 and the display of the second terminal 200, are the same. Heterogenous display means that a signal source of a display interface on the display of the first terminal 100 is independent of a signal source of a display interface on the display of the second terminal 200.

Figure 2A:
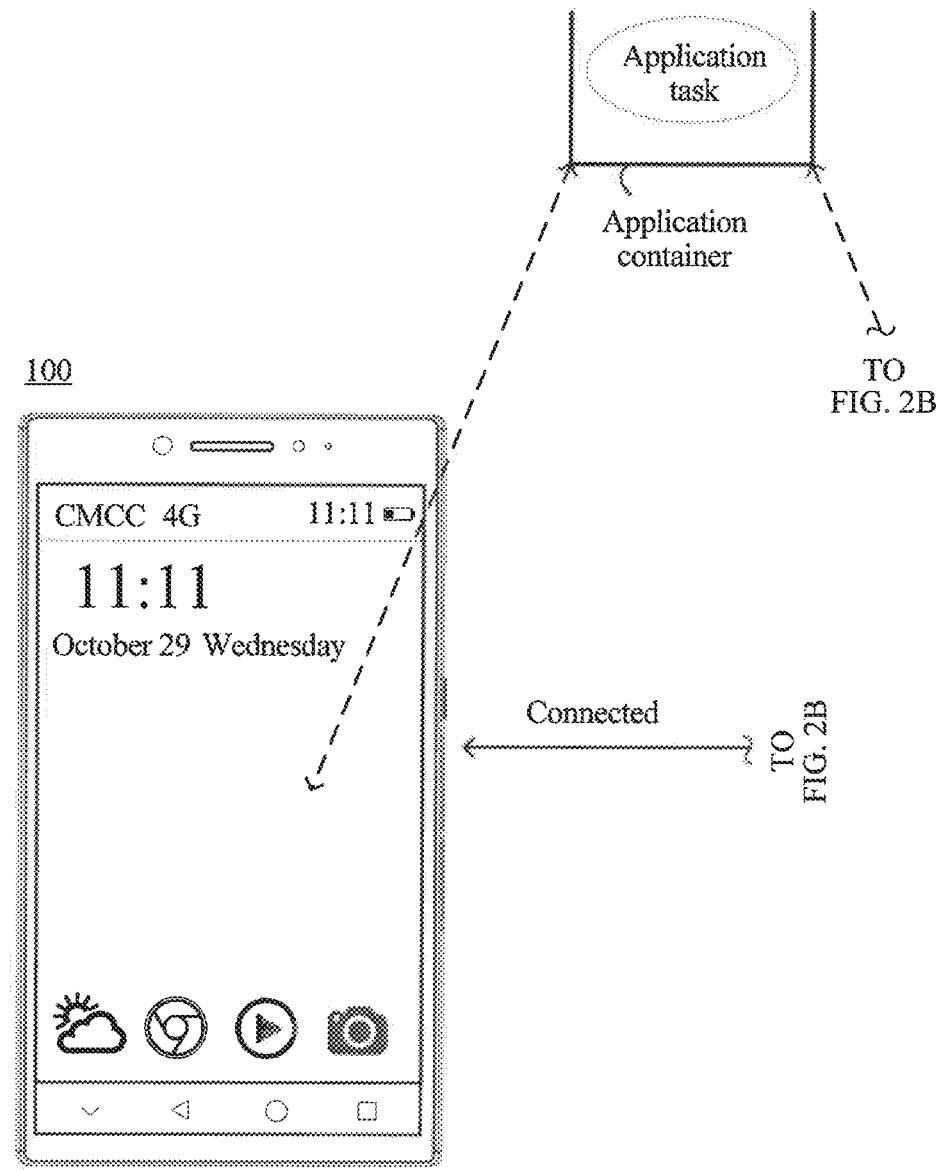
FIG. 2A and FIG. 2B are schematic diagrams of a homogenous display principle according to an embodiment of this application.
Figure 2B:
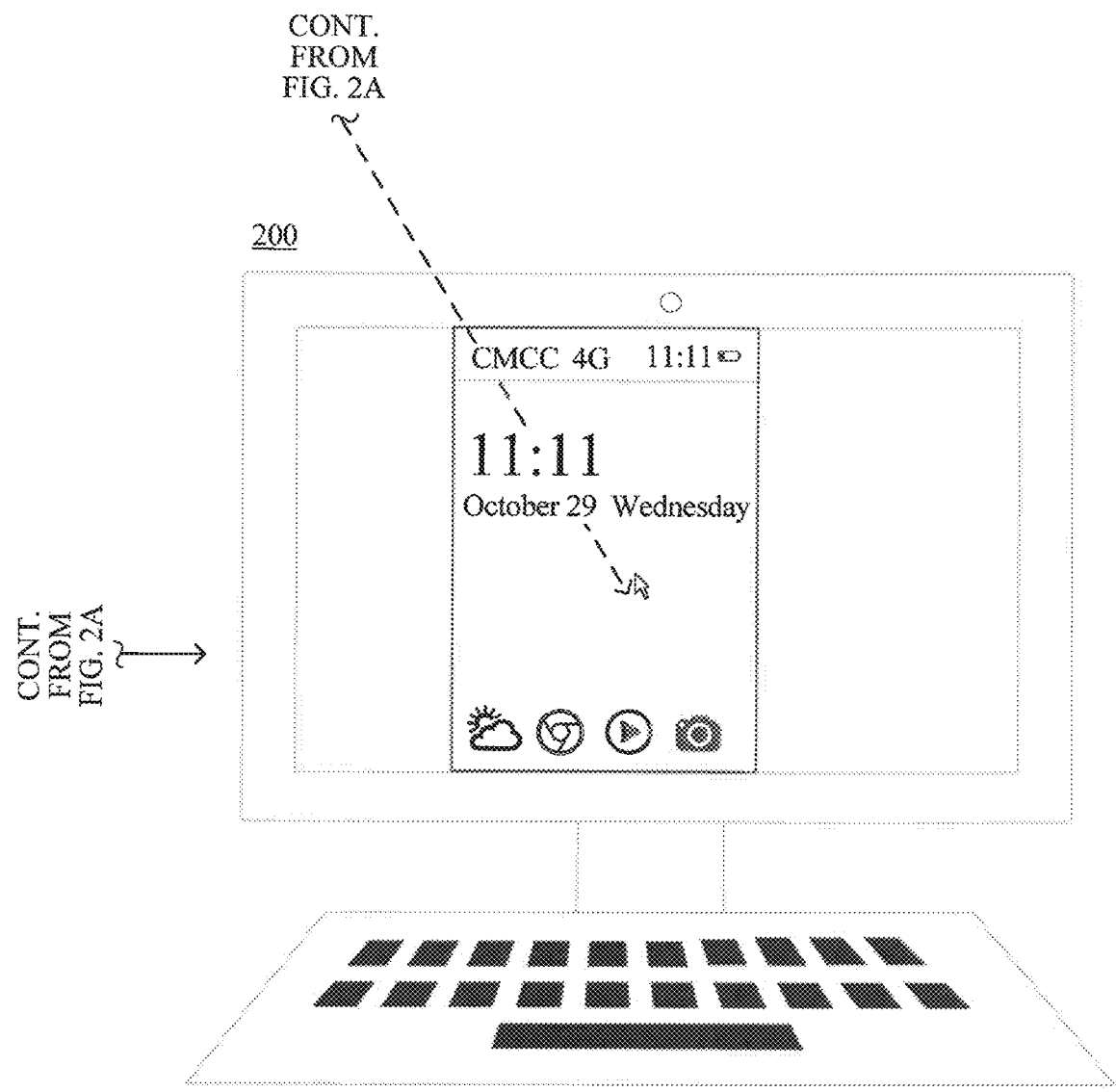
Figure 3A:
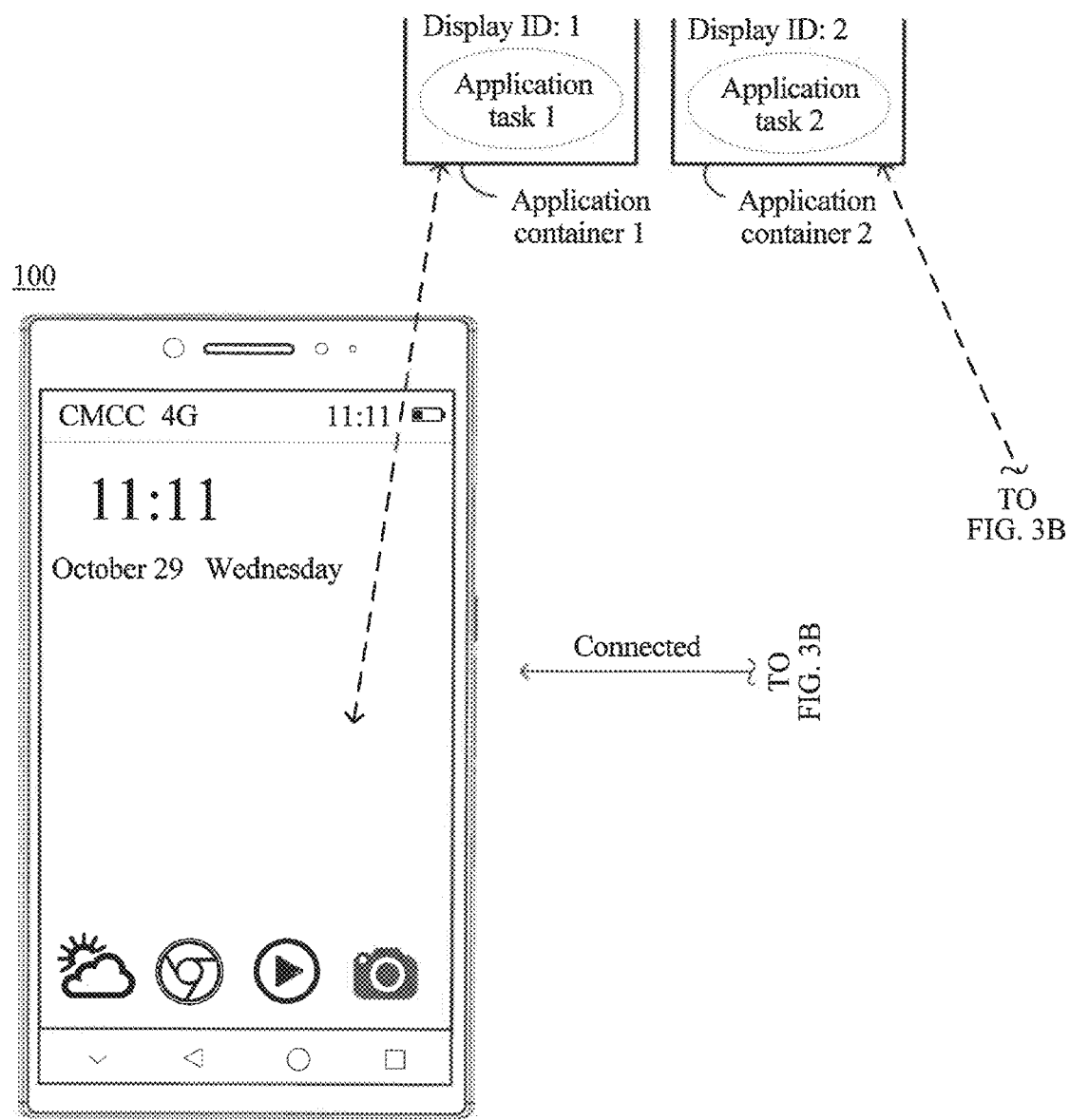
FIG. 3A and FIG. 3B are schematic diagrams of a heterogeneous display principle according to an embodiment of this application.
Figure 3B:
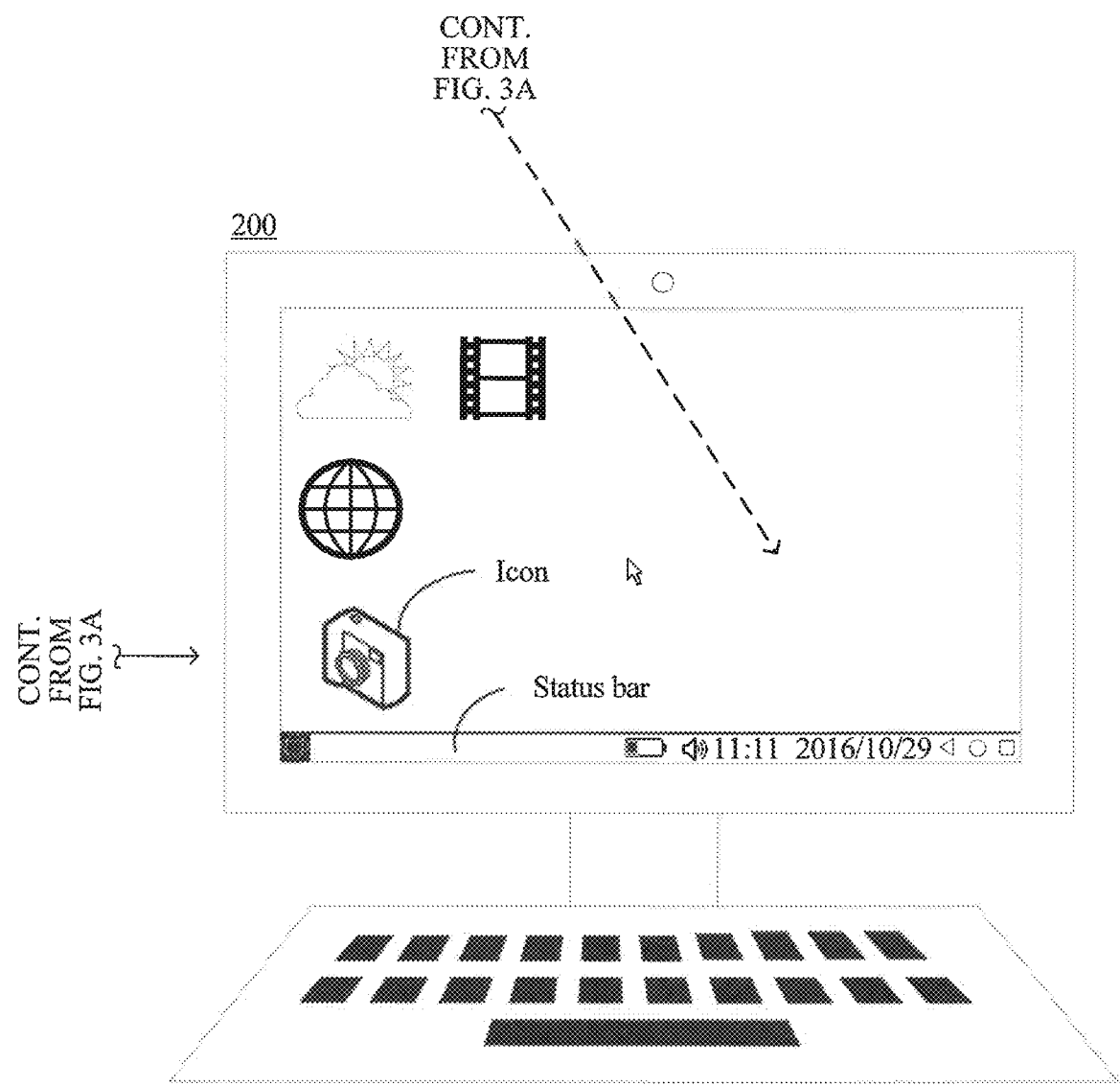

When the first terminal 100 homogeneously projects the application installed on the first terminal 100 onto the display of the second terminal 200, as shown in FIG. 2A and FIG. 2B, before the first terminal 100 connects to the second terminal 200, the first terminal 100 stores, in an application container of the application, an application task generated by the application. In this way, the first terminal 100 can present, in the display interface of the first terminal 100, related image display of the application simply by executing the application task in the application container. After the first terminal 100 connects to the second terminal 200, still as shown in FIG. 3A and FIG. 3B, the second terminal 200 may share the application container with the first terminal 100. In this case, display content in the display interface of the second terminal 200 is displayed the same as display content in the display interface of the first terminal 100, and synchronous display of the first terminal 100 and the second terminal 200 is implemented.

When the first terminal 100 heterogeneously projects the application installed on the first terminal 100 onto the display of the second terminal 200, as shown in FIG. 2A and FIG. 2B, before the first terminal 100 connects to the second terminal 200, the first terminal 100 stores, in an application container 1 (for example, an application stack corresponding to an interface of the first terminal 100), an application task that is generated by the application and that is being executed. In this way, the first terminal 100 displays a corresponding display interface on the display of the first terminal 100 when executing the application task in the application container 1.

After the first terminal 100 connects to the second terminal 200, the first terminal 100 may identify related specification information of the display of the second terminal 200 connected to the first terminal 100, for example, a resolution and dots per inch (Dots Per Inch, DPI) of the display of the second terminal 200. In this case, as shown in FIG. 2A and FIG. 2B, the first terminal 100 may set up, in a memory based on the specification information of the display of the second terminal 200, an application container 2 (for example, an application stack corresponding to an interface of the second terminal 200) for an application running on the display of the second terminal 200. The application container 1 and the application container 2 may be distinguished by using different display identifiers (Display ID).

After connecting to the second terminal 200, as shown in FIG. 2A and FIG. 2B, the first terminal 100 may initialize the display of the second terminal 200, to convert information such as an application icon on the first terminal 100 into a desktop application task, such as an application icon, an icon layout, and a status bar, that matches the specification information of the second terminal 200, and store the desktop application task in the application container 2. In this way, the second terminal 200 can independently project information such as icons of all applications installed on the first terminal 100 onto the display interface of the second terminal 200 simply by executing the desktop application task in the application container 2, to complete a process of initializing the display of the second terminal 200. Subsequently, the first terminal 100 and the second terminal 200 may independently run the two display interfaces in a same operating system by executing the application tasks in the respective application containers of the terminals.

The application container is storage space that is obtained by specially partitioning a memory when a terminal runs an application and that is used to store an application task generated by the application during running. For example, the application container may be specifically an application stack, and an application task at the top of the stack is content that is currently run and displayed on the terminal. For example, an application A generates a plurality of application tasks (task) in an application stack of the application A during running, and the terminal executes each task starting from the top of the stack and displays an execution result in a display interface of the terminal.

Figure 4A:
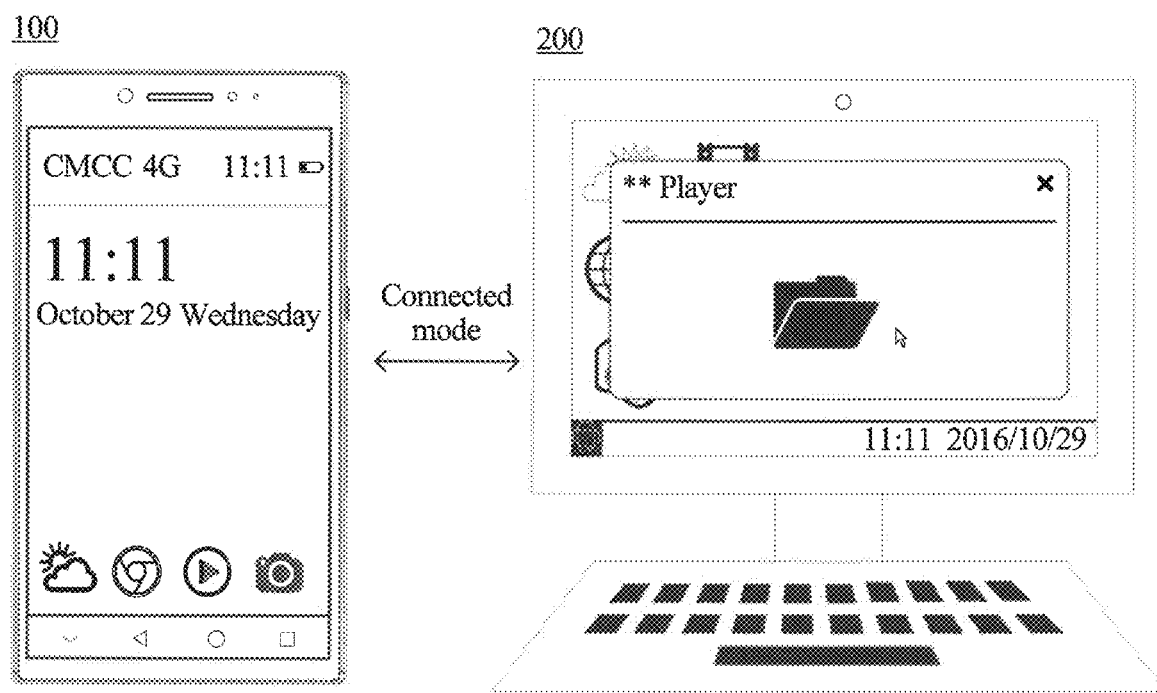
FIG. 4A, FIG. 4B, and FIG. 4C are schematic diagram of application scenarios before and after a first terminal disconnects from a second terminal in the prior art.
Figure 4B:
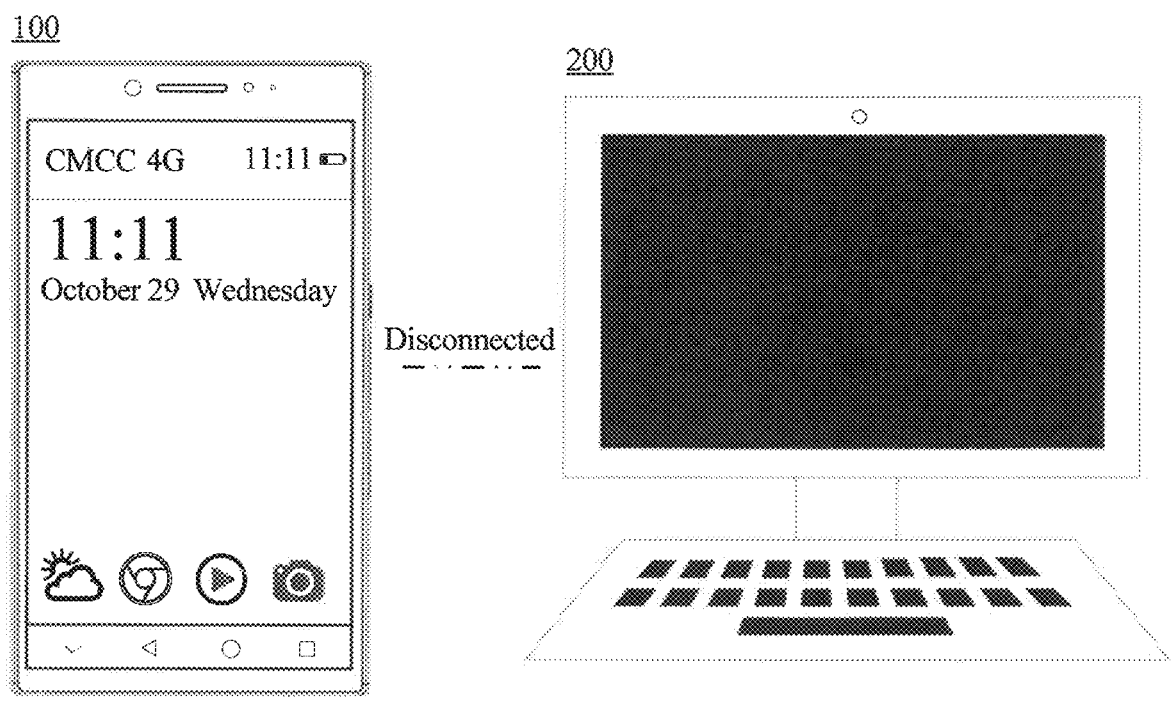
Figure 4C:
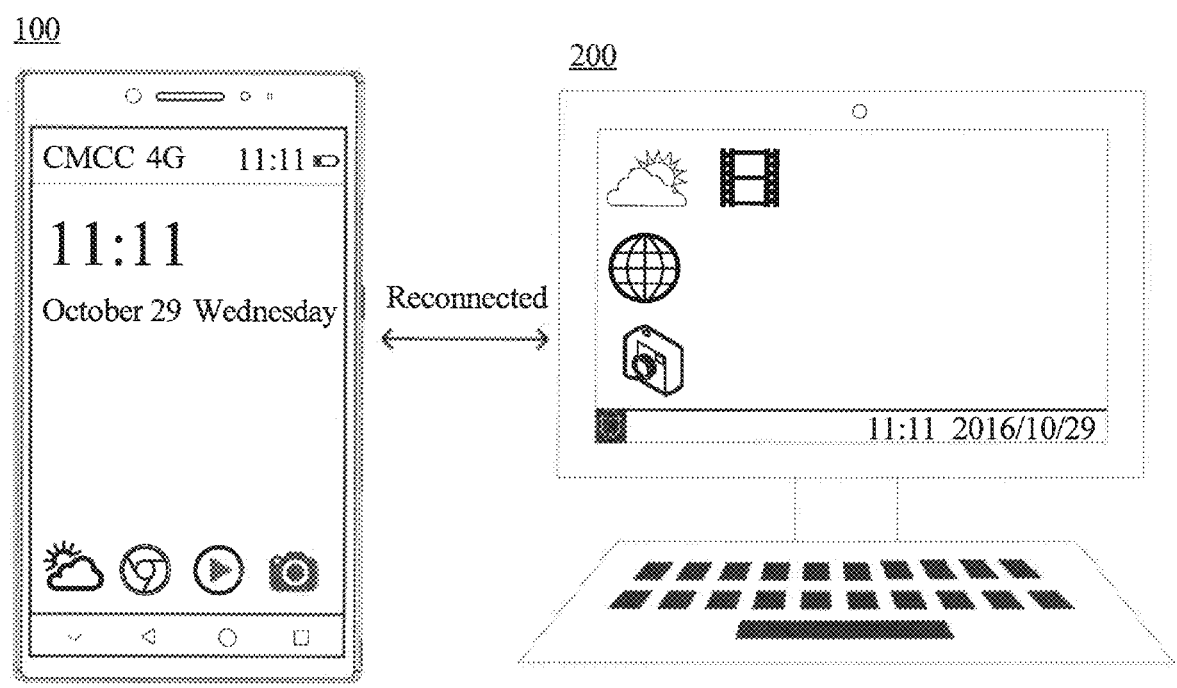

Currently, after the first terminal 100 connects to the second terminal 200, the first terminal 100 and the second terminal 200 may run two independent display interfaces in a same operating system. As shown FIG. 4B, the first terminal 100 and the second terminal 200 are in a connected mode, the display interface of the first terminal 100 is a desktop interface, and a player application is running in the display interface on the second terminal 200. When the first terminal 100 disconnects from the second terminal 200, the first terminal 100 deletes the application container 2 indicated by a display ID 2, to release a memory resource occupied by the application container 2. In this case, as shown in FIG. 4B, the display interface of the second terminal 200 is switched to a locked state or a native state of the second terminal 200. After the first terminal 100 reconnects to the second terminal 200, as shown in FIG. 4C, because the application container 2 corresponding to the display interface of the second terminal 200 has been deleted, the first terminal 100 re-initializes the display interface of the second terminal 200, and projects a desktop icon of an application or the like installed on the first terminal 100 onto the display interface of the second terminal 200.

In this case, if a user needs to continue running the player application, the user needs to restart the player application in the display interface of the second terminal 200. Alternatively, if a user needs to continue watching a movie played by the player application, for example, at the twenty-eighth minute, the user needs to restart the player application on the second terminal 200 and adjust a play time of the movie. In other words, the player application can continue before and after the disconnection, and a window of the player application that is being executed upon the previous disconnection cannot be resumed on the second terminal 200 for the user.

To resolve this, in this embodiment of this application, when the first terminal 100 disconnects from the second terminal 200, the first terminal 100 may record display content that is on the second terminal 200 and that is indicated by the application container 2 at this time. In this way, when the first terminal 100 reconnects to the second terminal 200, the first terminal 100 may resume the application container 2 based on the recorded display content on the second terminal 200, so as to resume, in the display interface of the second terminal 200, a related interface of a target application or the like that is being executed by the second terminal 200 upon the previous disconnection. In this way, the target application seamlessly continues before and after the first terminal 100 disconnects from the second terminal 200 is implemented, thereby improving user experience in multi-screen display performed by a terminal.

In addition, when executing a corresponding task in the application container 2 and displaying an execution result on the display of the second terminal 200, the first terminal 100 may adjust a corresponding display layout on the second display interface based on parameters such as a screen resolution of the second terminal 200 and an operation habit of using the second terminal 200 by a user, for example, may adjust a size and a location of an application window, an application icon, and the like. This is not limited in this embodiment of this application.

The display method provided in the embodiments of this application may be applied to any terminal such as a mobile phone, a wearable device, an AR (augmented reality)\VR (virtual reality) device, a tablet computer, a notebook computer, an UMPC (ultra-mobile personal computer), a netbook, and a PDA (personal digital assistant). This is not limited in this embodiment of this application.

Figure 5:
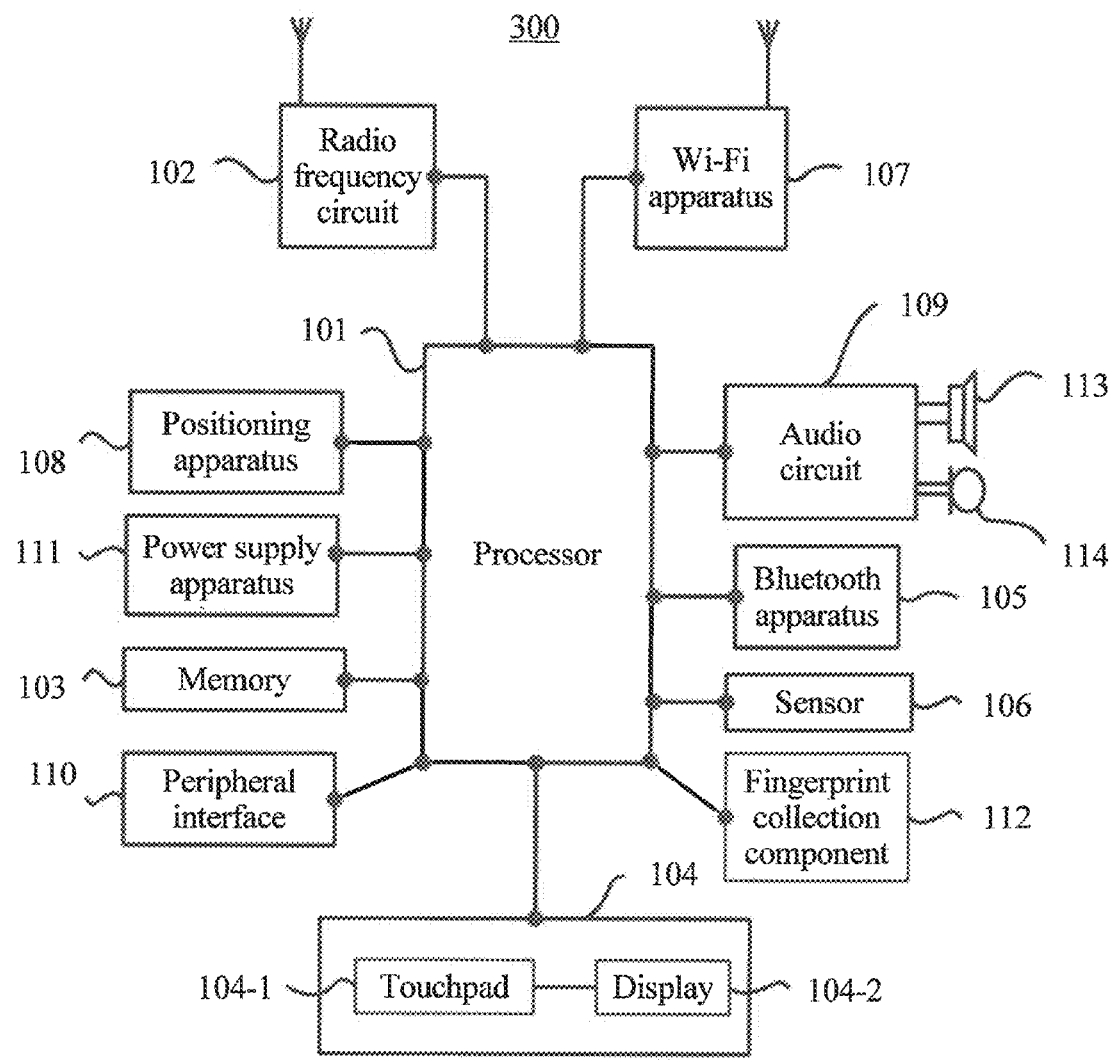
FIG. 5 is a schematic structural diagram of a mobile phone according to an embodiment of this application.

As shown in FIG. 5, the first terminal (or the second terminal) in this embodiment of this application may be a mobile phone 300. This embodiment is described below in detail by using the mobile phone 300 as an example. It should be understood that the mobile phone 300 shown in the figure is merely an example of the terminal, and the mobile phone 300 may include more or fewer components than those shown in the figure, may combine two or more components, or may have different component configurations.

As shown in FIG. 5, the mobile phone 300 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may communicate with each other by using one or more communications buses or signal cables (not shown in FIG. 5). A person skilled in the art may understand that a hardware structure shown in FIG. 5 constitute no limitation on the mobile phone. The mobile phone 300 may include more or fewer components than those shown in the figure, or combine some components, or have different component arrangements.

The components of the mobile phone 300 are described below in detail with reference to FIG. 5.

The processor 101 is a control center of the mobile phone 300. The processor 101 is connected to all parts of the mobile phone 300 by using various interfaces and lines, and performs various functions of the mobile phone 300 and data processing by running or executing an application program (which may be briefly referred to as an App below) stored in the memory 103, and by invoking the data stored in the memory 103. In some embodiments, the processor 101 may include one or more processing units. For example, the processor 101 may be a Kirin 960™ chip manufactured by Huawei Technologies Co., Ltd.

The radio frequency circuit 102 may be configured to receive and send a radio signal during information receiving and sending or during a call. In particular, the radio frequency circuit 102 may receive downlink data from a base station and then send the downlink data to the processor 101 for processing, and send uplink data to the base station. A radio frequency circuit usually includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol, including but not limited to a Global System for Mobile Communications, a general packet radio service, Code Division Multiple Access, Wideband Code Division Multiple Access, Long Term Evolution, an email, a short messaging service, and the like.

The memory 103 is configured to store an application program and data. The processor 101 runs the application program and the data stored in the memory 103, to perform various functions of the mobile phone 300 and process the data. The memory 103 mainly includes a program storage area and a data storage area. The program storage area may store an operating system and an application program (such as a sound playing function or an image playing function) that is required by at least one function. The data storage area may store data (such as audio data or a phonebook) that is created based on use of the mobile phone 300. In addition, the memory 103 may further include a high-speed random access memory, and may include a nonvolatile memory, for example, a magnetic disk storage device, a flash storage device, or another volatile solid-state storage device. The memory 103 may store various operating systems, for example, an iOS operating system developed by Apple Inc. or an Android operating system developed by Google Inc.

The touchscreen 104 may include a touchpad 104-1 and a display 104-2. The touchpad 104-1 may collect a touch event (for example, an operation performed by a user on the touchpad 104-1 or near the touchpad 104-1 by using any appropriate object such as a finger or a stylus) performed by a user of the mobile phone 300 on or near the touchpad 104-1, and send collected touch information to another device such as the processor 101. Although the touchpad 104-1 and the display screen 104-2 serve as two independent components in FIG. 5 to implement input and output functions of the mobile phone 300, in some embodiments, the touchpad 104-1 and the display screen 104-2 may be integrated to implement the input and output functions of the mobile phone 300. It may be understood that the touchscreen 104 is made of a plurality of layers of materials that are stacked together. In this embodiment of this application, only the touchpad (layer) and the display screen (layer) are displayed, and other layers are not recorded in this embodiment of this application. In addition, in some other embodiments of this application, the touchpad 104-1 may cover the display screen 104-2, and a size of the touchpad 104-1 is greater than a size of the display screen 104-2, so that the display screen 104-2 is fully covered by the touchpad 104-1. Alternatively, the touchpad 104-1 may be configured in a form of a full panel on a font surface of the mobile phone 300. In other words, all touches of a user on the front surface of the mobile phone 300 can be sensed by the mobile phone. In this way, full-touch experience can be implemented on the front surface of the mobile phone. In some other embodiments, the touchpad 104-1 is configured in a form of a full panel on a front surface of the mobile phone 300, and the display screen 104-2 is also configured in a form of a full panel on the front surface of the mobile phone 300. In this way, a bezel-less structure can be implemented on the front surface of the mobile phone.

In this embodiment of this application, the mobile phone 300 may further have a fingerprint recognition function. For example, a fingerprint sensor 112 may be configured on a rear surface (for example, below a rear-facing camera) of the mobile phone 300, or a fingerprint sensor 112 may be configured on the front surface (for example, below the touchscreen 104) of the mobile phone 300. For another example, a fingerprint collection component 112 may be configured inside the touchscreen 104 to implement the fingerprint recognition function. In other words, the fingerprint collection component 112 may be integrated with the touchscreen 104 to implement the fingerprint recognition function of the mobile phone 300. In this case, the fingerprint collection component 112 may be configured inside the touchscreen 104 as a part of the touchscreen 104 or may be configured inside the touchscreen 104 in another manner. A fingerprint sensor is a main component of the fingerprint collection component 112 in this embodiment of this application. The fingerprint sensor may use any type of sensing technology, including but not limited to an optical sensing technology, a capacitive sensing technology, a piezoelectric sensing technology, an ultrasonic sensing technology, and the like.

In this embodiment of this application, the mobile phone 300 may further include the Bluetooth apparatus 105, configured to implement data exchange between the mobile phone 300 and another terminal (for example, a mobile phone or a smartwatch) at a short distance from the mobile phone 300. The Bluetooth apparatus in this embodiment of this application may be an integrated circuit, a Bluetooth chip, or the like.

The Wi-Fi apparatus 107 is configured to provide the mobile phone 300 with network access that complies with a Wi-Fi related standard protocol. The mobile phone 300 may gain access to a Wi-Fi access point by using the Wi-Fi apparatus 107, to help a user receive and send an email, browse a web page, visit streaming media, and so on. The Wi-Fi apparatus 107 provides the user with wireless broadband Internet access. In some other embodiments, the Wi-Fi apparatus 107 may serve as a Wi-Fi radio access point and may provide another terminal with Wi-Fi network access.

The mobile phone 300 may further include at least one type of sensor 106, for example, an optical sensor, a motion sensor, or another sensor. Specifically, the optical sensor may include an ambient light sensor and a proximity sensor. The ambient light sensor may adjust luminance of the display of the touchscreen 104 based on brightness of ambient light, and the proximity sensor may turn off the display when the mobile phone 300 moves to an ear. As a type of motion sensor, an accelerometer sensor may detect an acceleration value in each direction (usually three axes), may detect a value and a direction of gravity when the accelerometer sensor is static, and may be applied to an application for recognizing a mobile phone gesture (such as switching between a landscape mode and a portrait mode, a related game, or magnetometer posture calibration), a function related to vibration recognition (such as a pedometer or a knock), and the like. For other sensors such as a gyroscope, a barometer, a hygrometer, a thermometer, and an infrared sensor that may be further configured on the mobile phone 300, details are not described herein.

The positioning apparatus 108 is configured to provide the mobile phone 300 with a geographical location. It may be understood that the positioning apparatus 108 may be specifically a receiver in a positioning system such as a Global Positioning System (GPS), the BeiDou Navigation Satellite System™, or the Russian GLONASS™. After receiving a geographical location sent by the foregoing positioning system, the positioning apparatus 108 sends the information to the processor 101 for processing, or sends the information to the memory 103 for storage. In some other embodiments, the positioning apparatus 108 may be a receiver in an Assisted Global Positioning System (AGPS). The AGPS system serves as an assisted server to assist the positioning apparatus 108 in completing ranging and positioning services. In this case, the assisted positioning server provides positioning assistance by communicating with the positioning apparatus 108 (namely, a GPS receiver) in a terminal such as the mobile phone 300 by using a wireless communications network. In some other embodiments, the positioning apparatus 108 may be a positioning technology based on a Wi-Fi access point. Because each Wi-Fi access point has one globally unique MAC address, when Wi-Fi is enabled, the terminal can scan and collect a broadcast signal of a surrounding Wi-Fi access point. Therefore, the terminal can obtain a MAC address broadcast by the Wi-Fi access point. The terminal sends, to a location server by using a wireless communications network, the data (for example, the MAC address) that can identify the Wi-Fi access point. The location server retrieves a geographical location of each Wi-Fi access point, calculates a geographical location of the terminal with reference to strength of the Wi-Fi broadcast signal, and sends the geographical location of the terminal to the positioning apparatus 108 in the terminal.

The audio circuit 109, a loudspeaker 113, and a microphone 114 can provide an audio interface between a user and the mobile phone 300. The audio circuit 109 may transmit, to the loudspeaker 113, an electrical signal converted from received audio data, and the loudspeaker 113 converts the electrical signal into a sound signal for output. In addition, the microphone 114 converts the collected sound signal into an electrical signal. The audio circuit 109 receives the electrical signal, and then converts the electrical signal into audio data and outputs the audio data to the RF circuit 102, to send the audio data to, for example, another mobile phone, or output the audio data to the memory 103 for further processing.

The peripheral interface 110 is configured to provide various interfaces for an external input/output device (for example, a keyboard, a mouse, an external display, an external memory, and a subscriber identity module card). For example, the terminal is connected to a mouse by using a universal serial bus (USB) port, and is connected, by using a metal contact in a cart slot of a subscriber identity module card, to the subscriber identity module (SIM) card provided by a telecommunications operator. The peripheral interface 110 may be used to couple the foregoing external input/output device to the processor 101 and the memory 103.

In this embodiment of this application, the first terminal 100 may connect to the display of the second terminal 200 by using the peripheral interface 110 of the first terminal 100, so that the first terminal 100 and the second terminal 200 can communicate with each other.

The mobile phone 300 may further include the power supply apparatus 111 (for example, a battery and a power management chip) that supplies power to all the components. The battery may be logically connected to the processor 101 by using the power management chip, to implement functions such as charging management, discharging management, and power consumption management by using the power supply apparatus 111.

Although not shown in FIG. 5, the mobile phone 300 may further include a camera (a front-facing camera and/or a rear-facing camera), a camera flash, a micro projection apparatus, a near field communication (NFC) apparatus, and the like. Details are not described herein.

Figure 6:
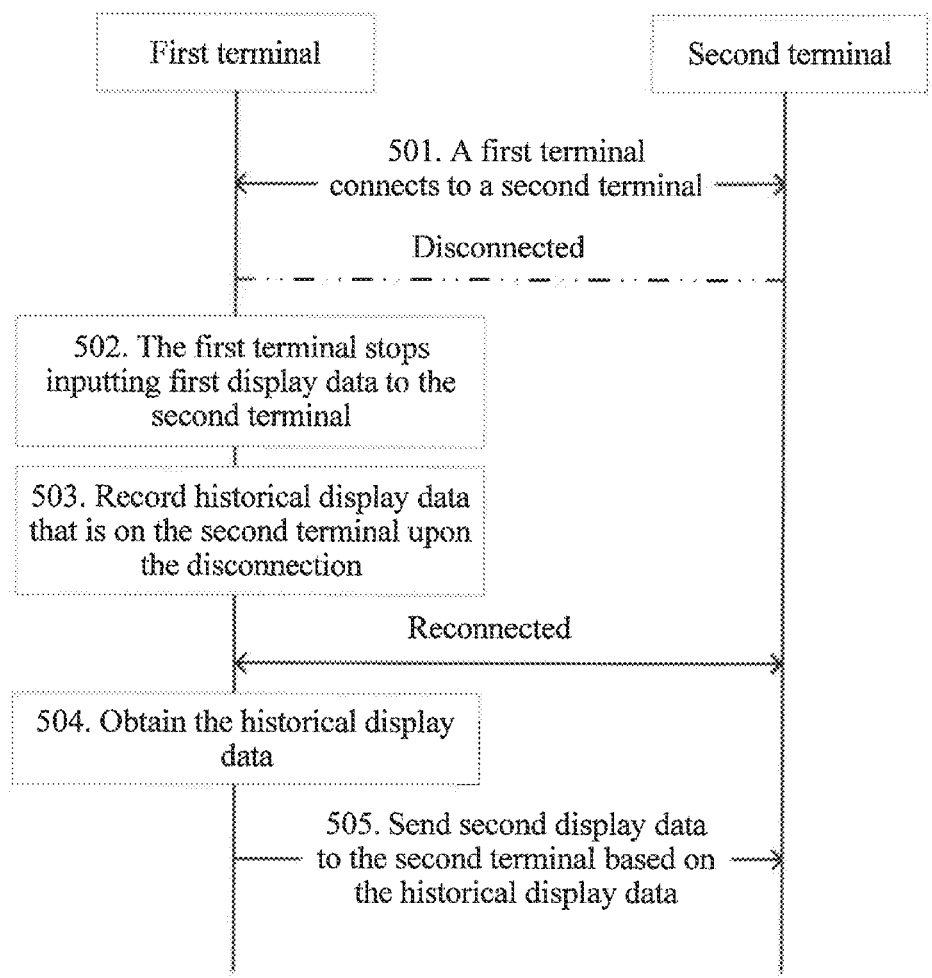
FIG. 6 is a schematic flowchart of a display method according to an embodiment of this application.

A display method provided in an embodiment of this application is described below in detail with reference to specific embodiments. As shown in FIG. 6, the method includes the following steps.

501. A first terminal 100 connects to a second terminal 200, so that the first terminal 100 and the second terminal 200 can communicate with each other.

The first terminal 100 may connect to the second terminal 200 by using Bluetooth, Wi-Fi, a ZigBee protocol (ZigBee), or another communication mode. This is not limited in this embodiment of this application.

Figure 7A:
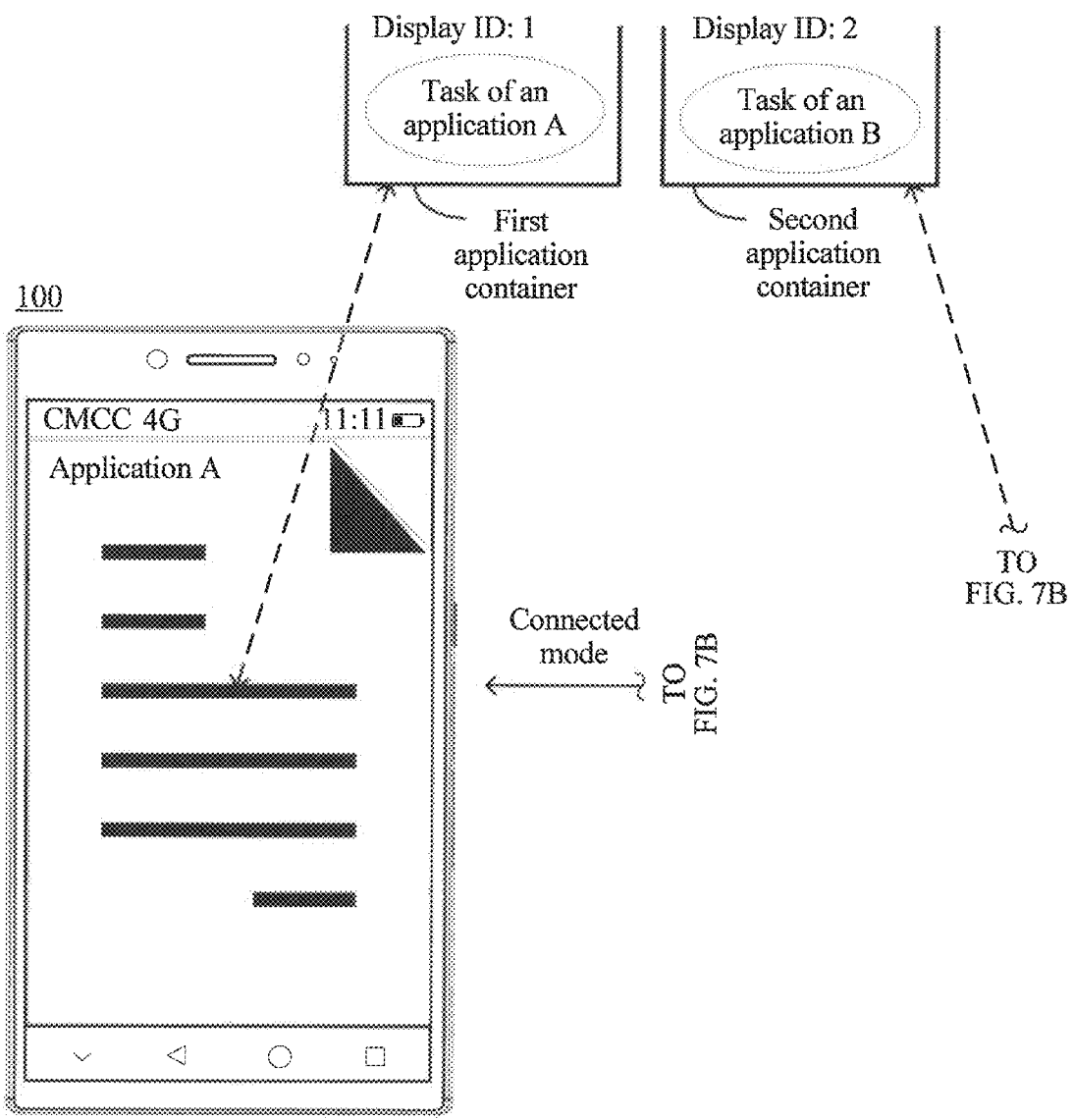
FIG. 7A and FIG. 7B are schematic diagrams 1 of an application scenario of a display method according to an embodiment of this application.
Figure 7B:
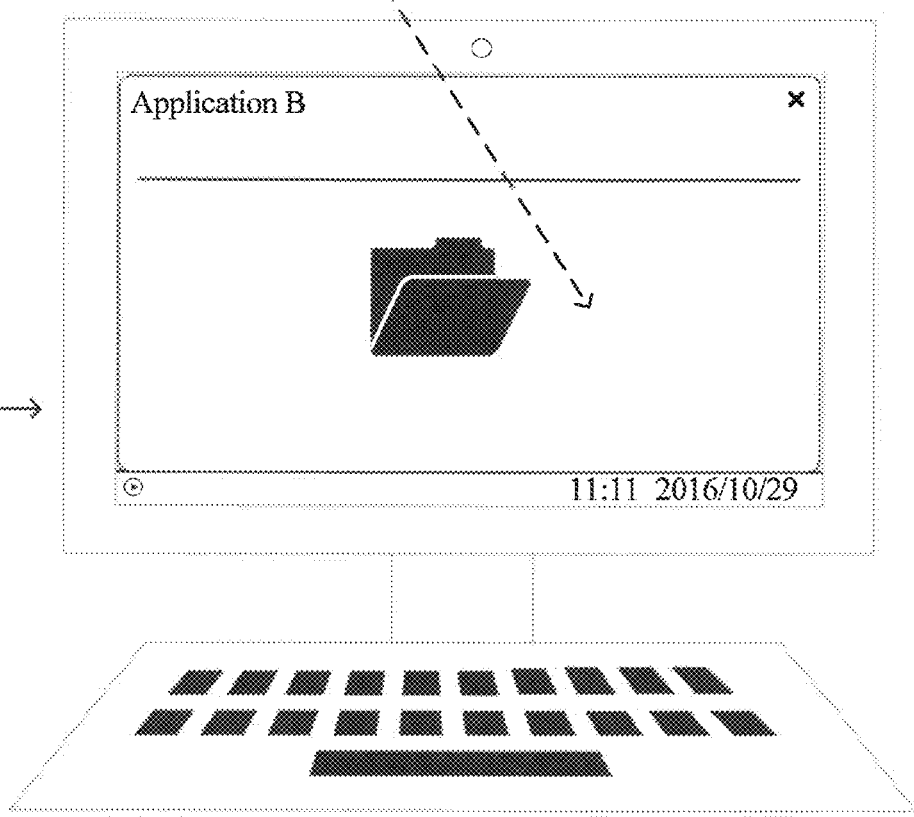

As shown in FIG. 7A and FIG. 7B, after the first terminal 100 connects to the second terminal 200, different display IDs may be used to distinguish between a first application container corresponding to the first terminal 100 and a second application container corresponding to the second terminal 200. For example, in FIG. 7A and FIG. 7B, an application task in the first application container corresponds to a display interface of the first terminal 100, and an application task in the second application container corresponds to a display interface of the second terminal 200.

In this way, when a user operates an application A on the first terminal 100, the first terminal 100 is triggered to store, in the first application container, a related application task generated by the application A. The first terminal 100 executes the application task in the first application container, and displays an execution result in the display interface of the first terminal 100. In addition, when it is detected that the user operates an application B on the second terminal 200, the first terminal 100 may store, in the second application container, a related application task generated by the application B. The first terminal 100 executes the application task in the second application container, and displays output in the display interface of the second terminal 200.

In this case, the application B running in the display interface of the second terminal 200 is a target application. Therefore, when the first terminal 100 disconnects from the second terminal 200, for example, a data cable between the first terminal 100 and the second terminal 200 is in poor contact, or the user walks out of a maximum connection distance between the first terminal 100 and the second terminal 200 when using the first terminal 100 to answer a call, the first terminal 100 may continue to perform the following steps 502 to 505.

502. When the first terminal 100 disconnects from the second terminal 200, the first terminal 100 stops inputting first display data to the second terminal 200, so that a target application running in a display interface of the second terminal 200 is closed.

The first display data is display content that is displayed in the display interface of the second terminal 200 before the first terminal 100 disconnects from the second terminal 200. In this case, the display interface of the second terminal 200 may be referred to as a first interface, and the display interface of the first terminal 100 may be referred to as a second interface. The first interface is different from the second interface. For example, in FIG. 7A and FIG. 7B, the first interface is a display interface of the application B, and the second interface is a display interface of the application A.

In addition, the target application may be a video application, a text application, an instant messaging application, a game application, or the like. This is not limited in this embodiment of this application.

When the first terminal 100 disconnects from the second terminal 200, communication between the first terminal 100 and the second terminal 200 is interrupted. In this case, the first display data (for example, display data generated when the application task in the second application container is executed) generated for a display of the second terminal 200 in the first terminal 100 cannot be output to a display of the second terminal 200. Consequently, a window of the target application running in the display interface of the second terminal 200 is forcibly closed.

Figure 8:
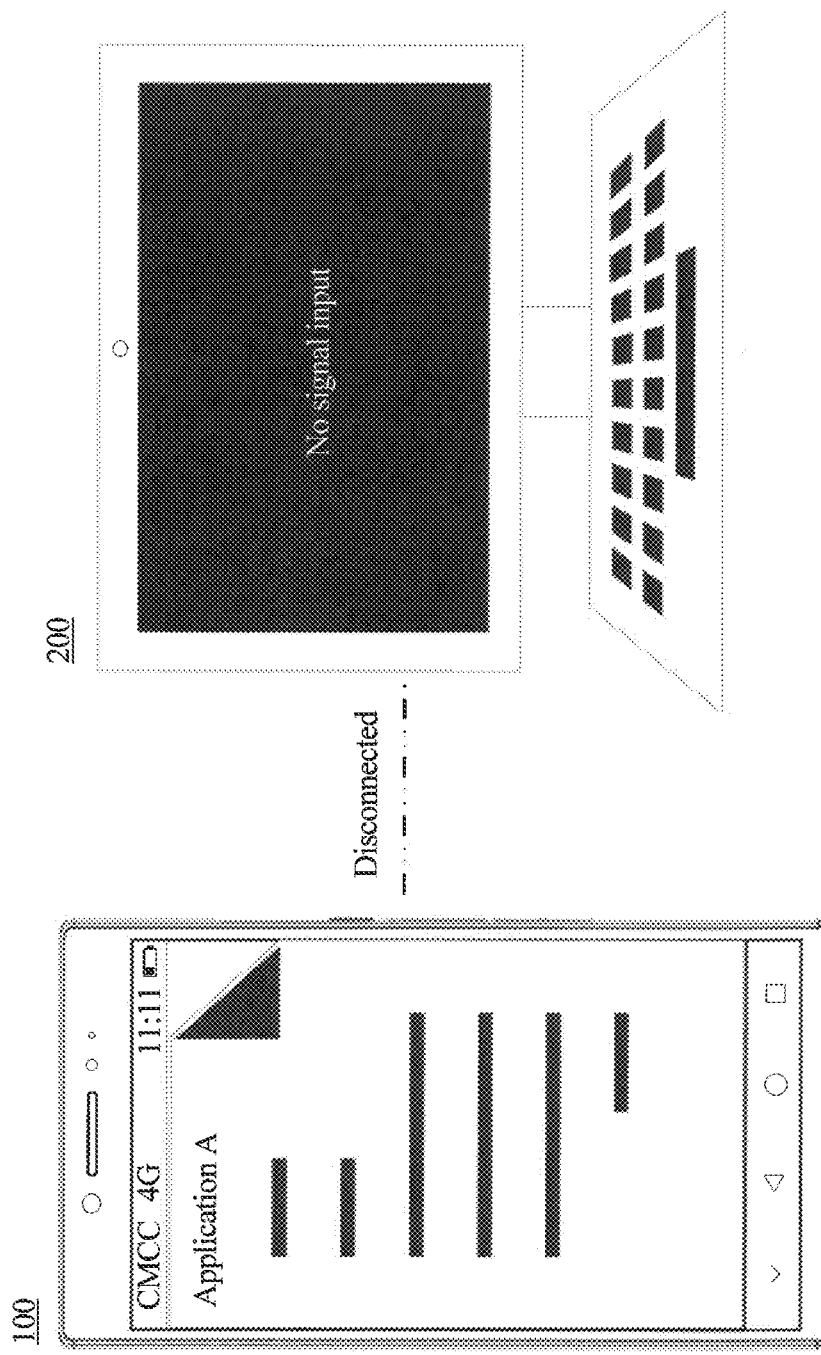
FIG. 8 is a schematic diagram 2 of an application scenario of a display method according to an embodiment of this application.

As shown in FIG. 8, after the first terminal 100 disconnects from the second terminal 200, a window of the application B (the target application) originally running in the display interface of the second terminal 200 is forcibly closed, and the second terminal 200 switches back to a native state. As shown in FIG. 8, the native state may be a standby state in which no signal is input. Certainly, the native state may be any state configured in an operating system of the second terminal 200, for example, a lock screen state or a black screen state.

503. The first terminal 100 records historical display data that is on the second terminal 200 when the first terminal 100 disconnects from the second terminal 200, where the historical display data is used to indicate display content that is on the second terminal 200 at this time.

504. When the first terminal 100 reconnects to the second terminal 200, the first terminal 100 obtains the historical display data.

505. The first terminal 100 sends second display data to the second terminal 200 based on the historical display data, so that a window of the target application is resumed in the display interface of the second terminal 200.

The second display data is display content that is displayed in the display interface of the second terminal 200 after the first terminal 100 reconnects to the second terminal 200. In this case, the display interface of the second terminal 200 may be referred to as a third interface, and the third interface is correlated with the first interface displayed on the second terminal 200 before the disconnection.

For example, an application displayed in the third interface is the same as an application displayed in the first interface; or an interface displayed in the third interface is totally the same as an interface displayed in the first interface; or an interface displayed in the third interface and an interface displayed in the first interface are adjacent interfaces of one application, and so on. This is described below in detail with reference to specific embodiments in this embodiment of this application.

In order that the target application can seamlessly continue in the display interface of the second terminal 200 when the first terminal 100 reconnects to the second terminal 200, when the first terminal 100 disconnects from the second terminal 200, the first terminal 100 stores the historical display data used to indicate the display content that is on the second terminal 200 at this time.

It should be noted that there is no limited time sequence between step 503 and step 502. When the first terminal 100 disconnects from the second terminal 200, the first terminal 100 may first perform step 502 and then perform step 503, or first perform step 503 and then perform step 502, or simultaneously perform steps 502 and 503. This is not limited in this embodiment of this application.

In a possible design method, the historical display data may be specifically an application task, of the target application, in the second application container.

Figure 9:
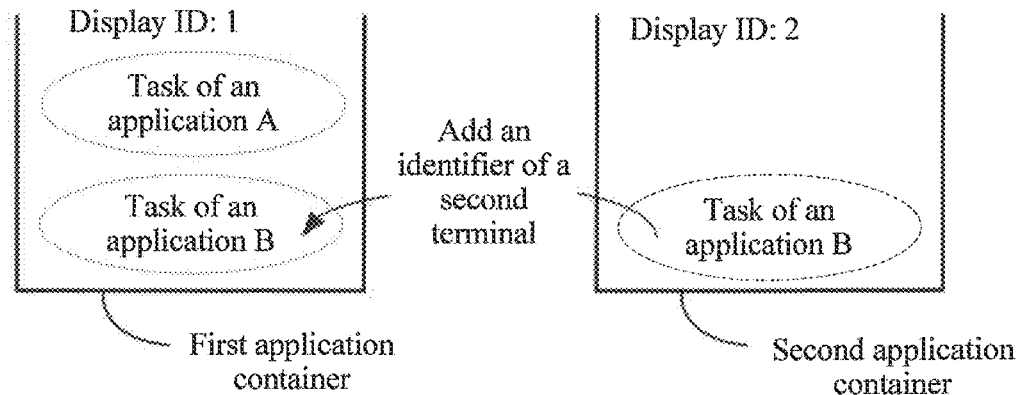
FIG. 9 is a schematic diagram 3 of an application scenario of a display method according to an embodiment of this application.

For example, as shown in FIG. 9, when the first terminal 100 disconnects from the second terminal 200, the first terminal 100 may add an identifier of the second terminal 200 to an application task, of the target application (namely, the application B), that is in the second application container at this time, move the application task to the first application container corresponding to the display interface of the first terminal 100, and then delete the second application container.

Figure 10:
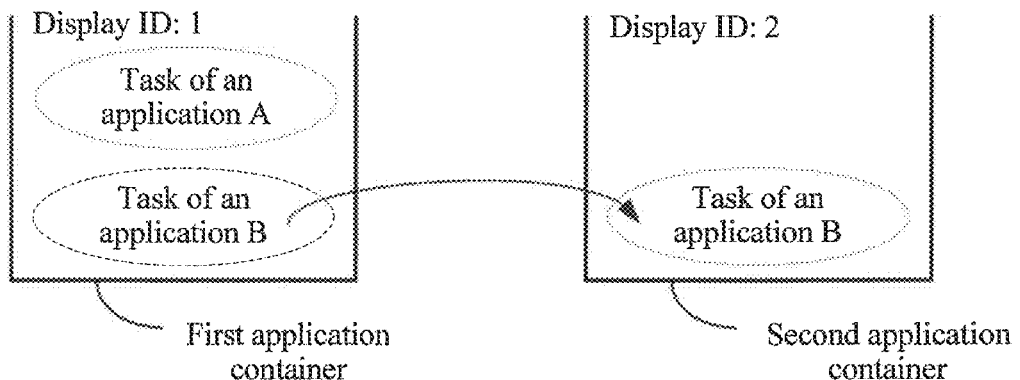
FIG. 10 is a schematic diagram 4 of an application scenario of a display method according to an embodiment of this application.

Therefore, when the first terminal 100 subsequently reconnects to the second terminal 200, as shown in FIG. 10, the first terminal 100 may recreate the second application container corresponding to the display interface of the second terminal 200, and resume, the second application container, the application task that is of the application B and that is in the first application container.

Figure 13:
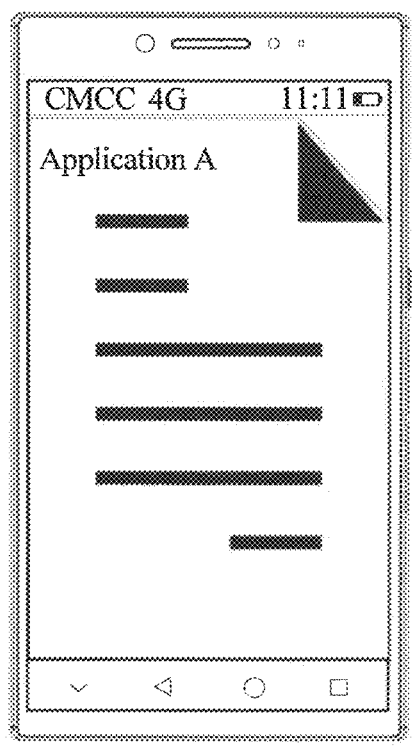
FIG. 13 is a schematic diagram 7 of an application scenario of a display method according to an embodiment of this application.
Figure 13:
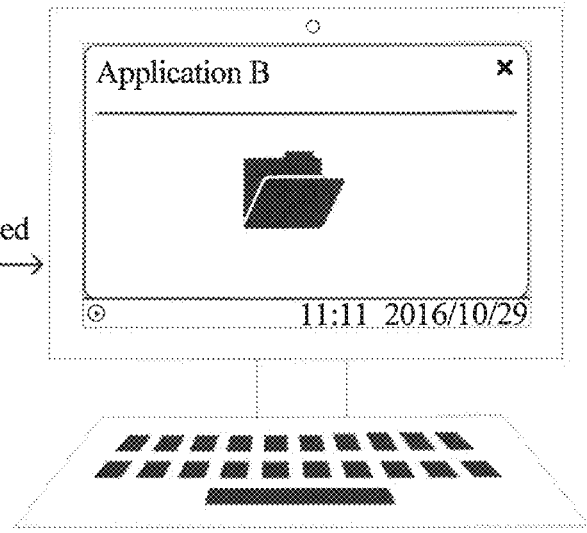

In this way, as shown in FIG. 13, the first terminal 100 may continue to execute the resumed application task in the second application container, and display an execution result in the display interface of the second terminal 200, so that the window of the application B before the disconnection is resumed in the display interface of the second terminal 200, and the application B seamlessly continues before and after the disconnection is implemented.

In another possible design method, the historical display data may be specifically running status information of the target application upon the disconnection, for example, at least one of an application package name, path information, encryption information, and the like of the target application upon the disconnection.

Figure 11:
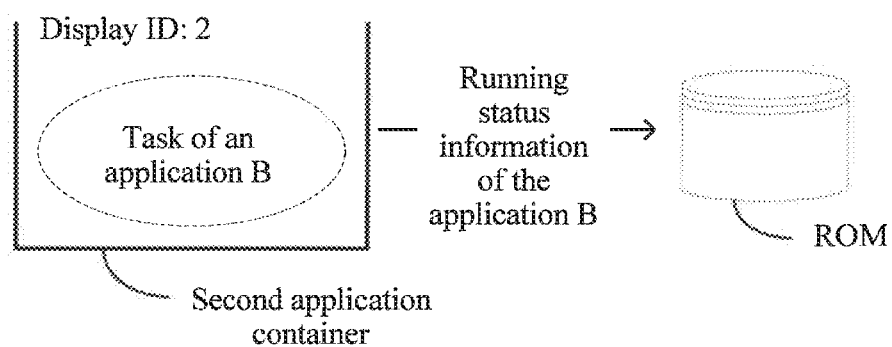
FIG. 11 is a schematic diagram 5 of an application scenario of a display method according to an embodiment of this application.

For example, as shown in FIG. 11, when the first terminal 100 disconnects from the second terminal 200, the first terminal 100 may extract the running status information such as the application package name of the application B based on an application task, of the target application (namely, the application B), that is in the second application container at this time, store the running status information in a read-only memory (ROM) of the first terminal 100, and then delete the second application container.

Figure 12:
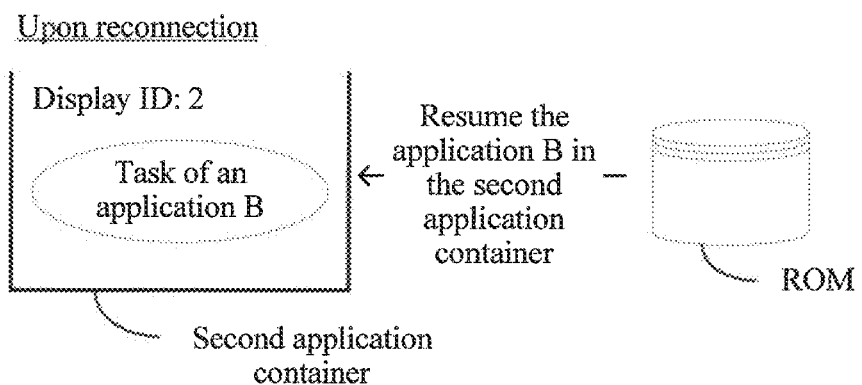
FIG. 12 is a schematic diagram 6 of an application scenario of a display method according to an embodiment of this application.

Therefore, when the first terminal 100 subsequently reconnects to the second terminal 200, as shown in FIG. 12, the first terminal 100 may recreate the second application container for the display interface of the second terminal 200, and resume, in the second application container, the application task of the application B based on the running status information of the application B that is stored in the ROM.

In this way, as shown in FIG. 13, the first terminal 100 may continue to execute the resumed application task in the second application container, and display an execution result in the display interface of the second terminal 200, so that the window of the application B before the disconnection is resumed in the display interface of the second terminal 200, and the application B seamlessly continues before and after the disconnection is implemented.

Further, the running status information may include a historical location of the window of the application B upon the disconnection. In this case, the first terminal 100 may resume the window of the application B at a corresponding location in the display interface of the second terminal 200 based on the historical location, so that the window of the application B is displayed at a same location on the second terminal 200 before and after the disconnection. This further improves user experience in multi-screen display performed by a terminal.

In addition, because the running status information of the application B is stored in the ROM of the first terminal 100, the running status information is not lost even after the first terminal 100 is powered off and powered on again. In other words, in the foregoing embodiment, even if the first terminal 100 is powered off and powered on again after the first terminal 100 disconnects from the second terminal 200, after the first terminal 100 reconnects to the second terminal 200, the first terminal 100 can also resume the window of the application B in the display interface of the second terminal 200. In this way, the application B seamlessly continues before and after the disconnection is implemented.

Figure 14:
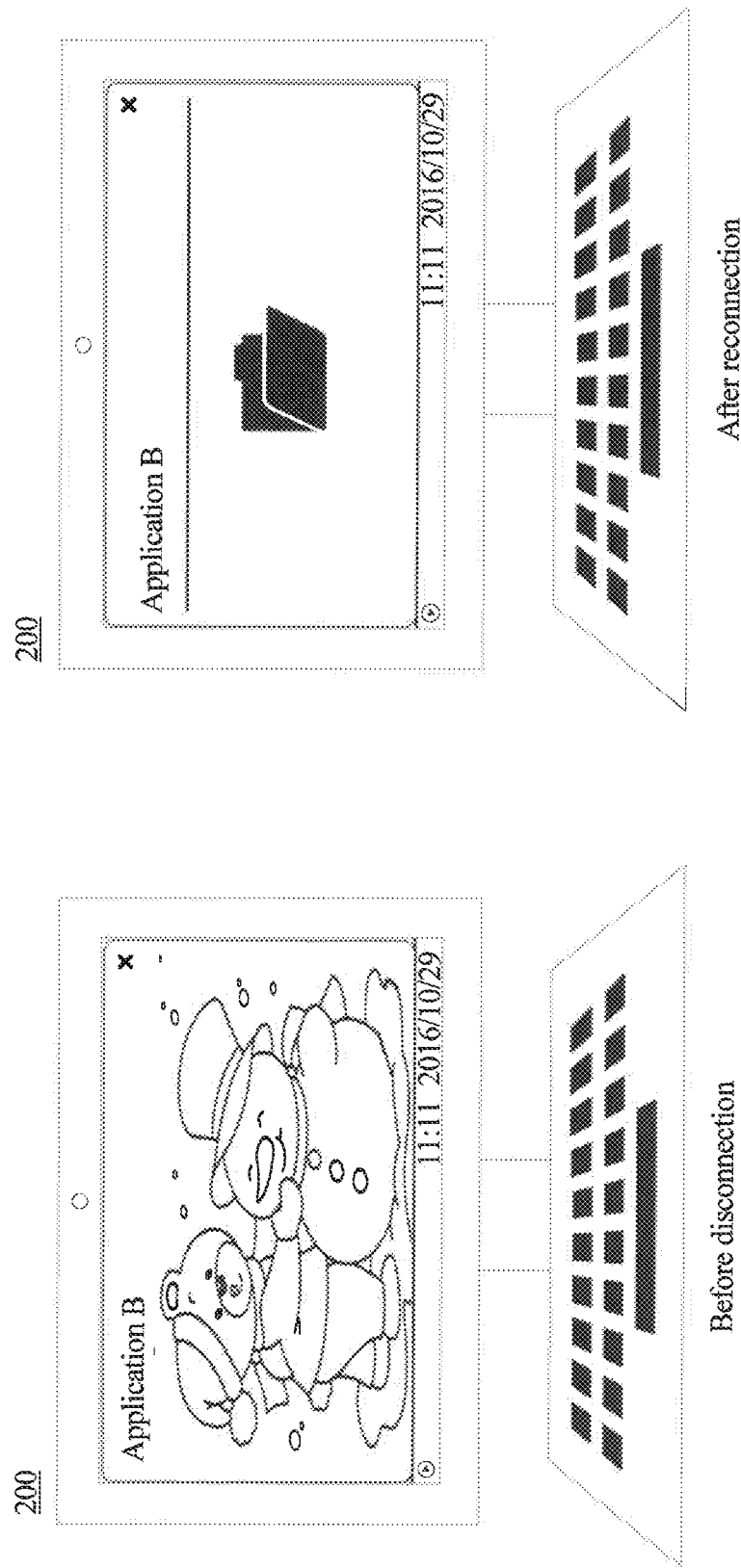
FIG. 14 is a schematic diagram 8 of an application scenario of a display method according to an embodiment of this application.

In some embodiments of this application, as shown in FIG. 14, when the first terminal 100 and the second terminal 200 are in a connected mode, the window of the application B is displayed in the display interface of the second terminal 200. If the first terminal 100 records only the application package name of the application B in the display interface of the second terminal 200 when the first terminal 100 disconnects from the second terminal 200, when the first terminal 100 reconnects to the second terminal 200, still as shown in FIG. 14, the first terminal 100 may restart the application B in the display interface of the second terminal 200 based on the recorded application package name of the application B. In this case, a display interface in the window of the application B in the display interface of the second terminal 200 may be different from a display interface in the window of the application B before the disconnection.

Figure 15:
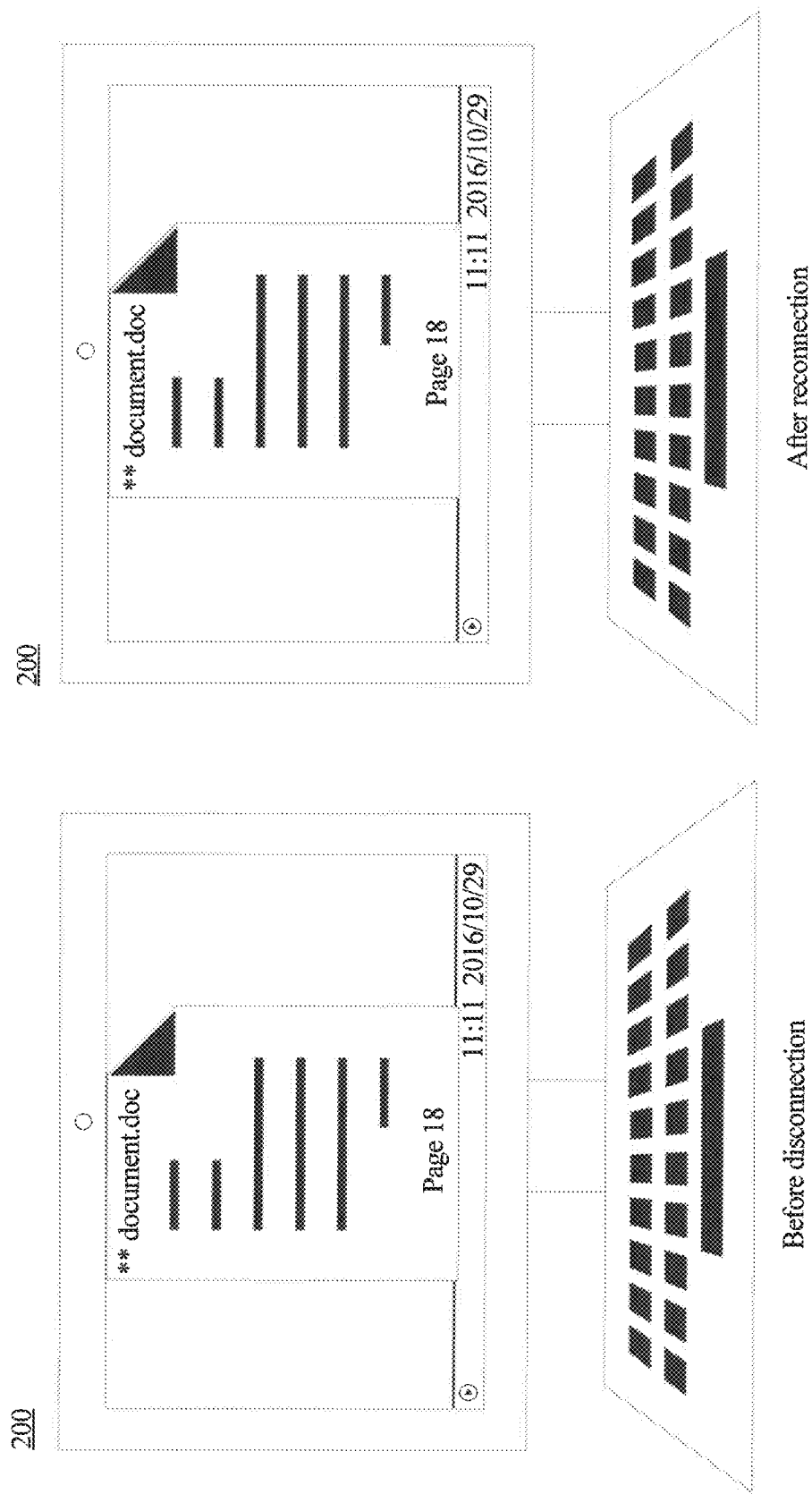
FIG. 15 is a schematic diagram 9 of an application scenario of a display method according to an embodiment of this application.

In some other embodiments of this application, as shown in FIG. 15, when the first terminal 100 and the second terminal 200 are in a connected mode, a window of a read type application is displayed in the display interface of the second terminal 200. For example, text content on Page 18 is being displayed in the window. When the first terminal 100 disconnects from the second terminal 200, the first terminal 100 may record an application package name of the read type application and a currently displayed page number Page 18. Therefore, when the first terminal 100 reconnects to the second terminal 200, still as shown in FIG. 15, the first terminal 100 may restart the read type application in the display interface of the second terminal 200 based on the recorded application package name of the read type application. In addition, the first terminal 100 may further display, in the display interface of the second terminal 200, the text content on Page 18 again based on the recorded currently displayed page number. In other words, document content displayed in the third interface is the same as document content displayed in the first interface. In this way, the read type application seamlessly continues on the second terminal 200 before and after the disconnection is implemented.

Figure 16:
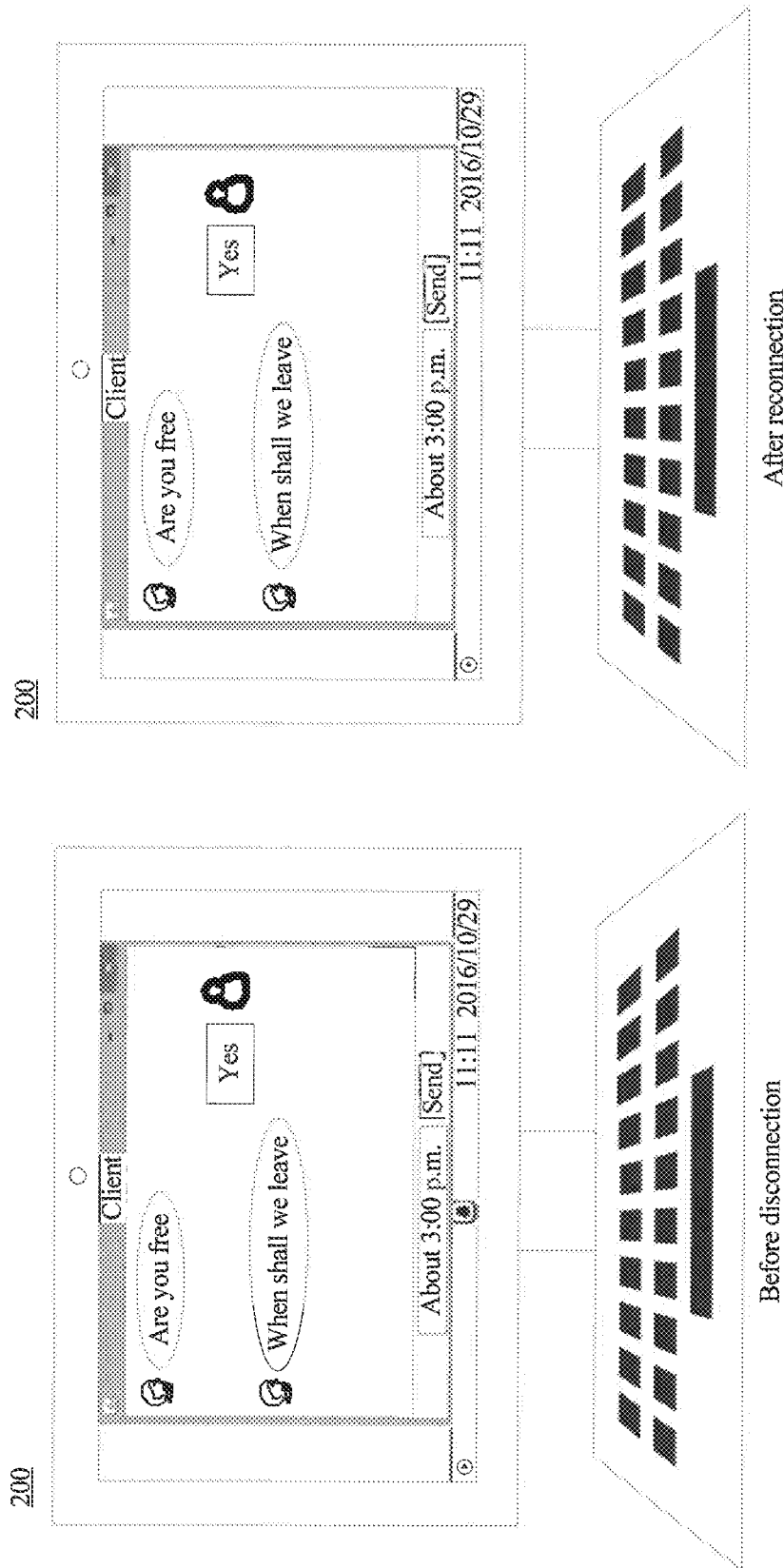
FIG. 16 is a schematic diagram 10 of an application scenario of a display method according to an embodiment of this application.

In some other embodiments of this application, as shown in FIG. 16, when the first terminal 100 and the second terminal 200 are in a connected mode, a window of an instant messaging application is displayed in the display interface of the second terminal 200, a user is inputting chat information to an input box of the instant messaging application, and the chat information has not been sent. When the first terminal 100 disconnects from the second terminal 200, the first terminal 100 may record an application package name of the instant messaging application, a current chat record, and the chat information input to the input box. Therefore, when the first terminal 100 reconnects to the second terminal 200, still as shown in FIG. 16, the first terminal 100 may restart the instant messaging application in the display interface of the second terminal 200 based on the recorded application package name of the instant messaging application. In addition, the first terminal 100 may further display again, in the display interface of the second terminal 200 based on the recorded chat record and the chat draft (for example, "may be 3:00 p.m." that has not been sent by the user in FIG. 16) input to the input box, the chat record of the user and the chat draft input to the input box. In this way, the instant messaging application seamlessly continues on the second terminal 200 before and after the disconnection is implemented.

Figure 17A:
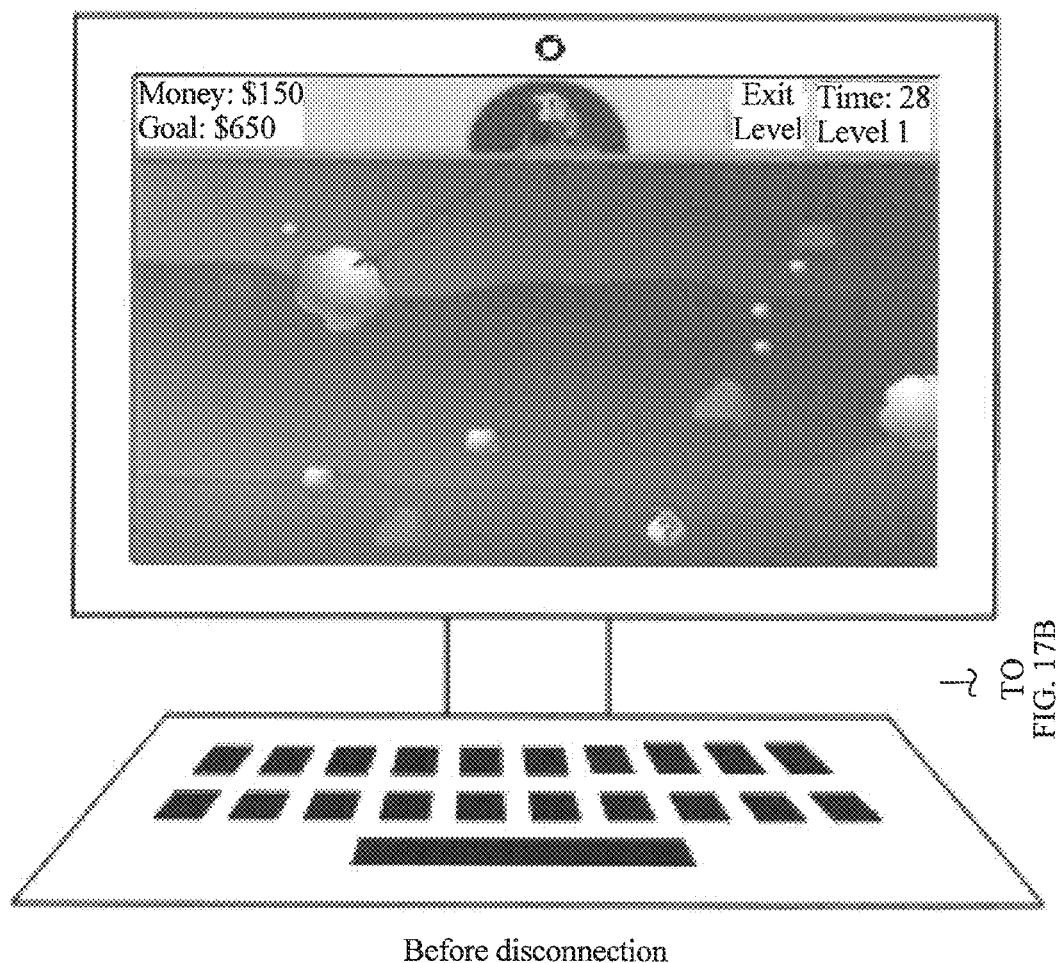
FIG. 17A and FIG. 17B are schematic diagrams 11 of an application scenario of a display method according to an embodiment of this application.
Figure 17B:
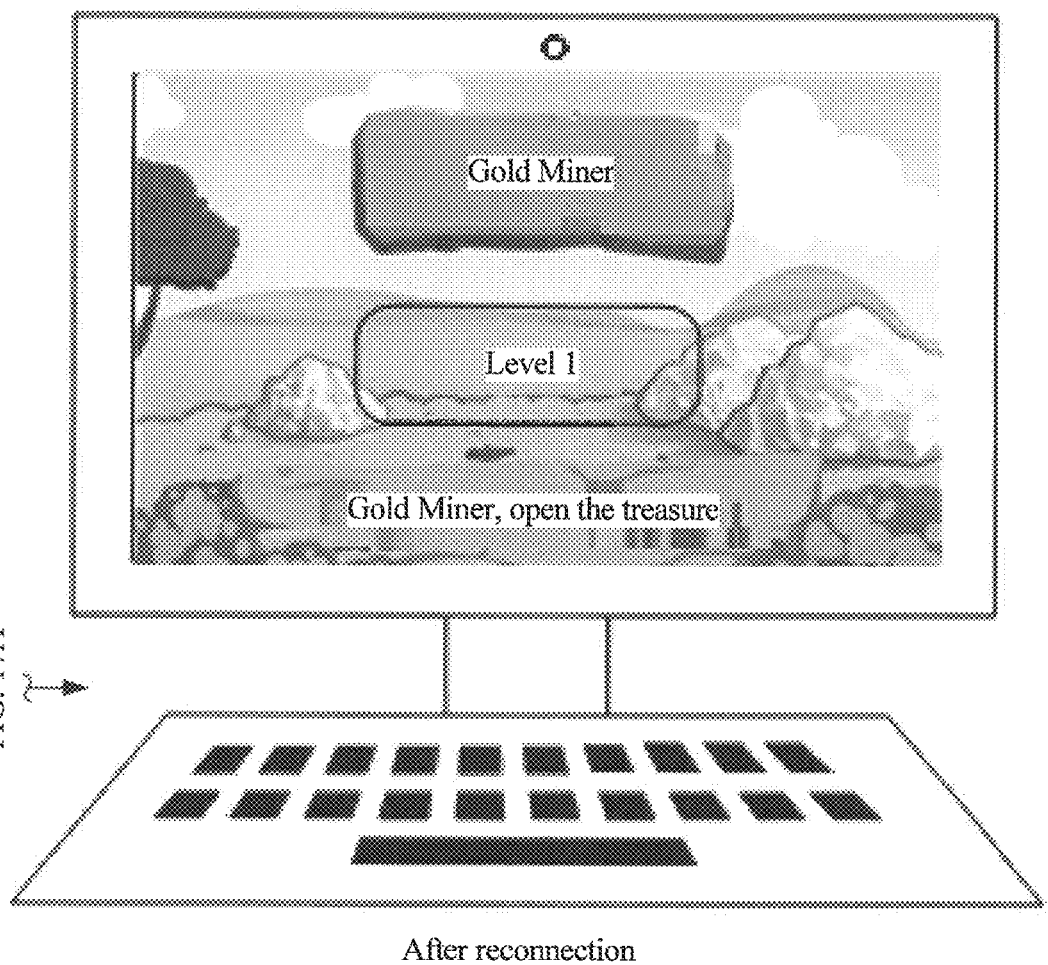

In some other embodiments of this application, as shown in FIG. 17A and FIG. 17B, when the first terminal 100 and the second terminal 200 are in a connected mode, a window of a game application is displayed in the display interface of the second terminal 200. For example, a game interface of Level 1 of Gold Miner is being displayed. When the first terminal 100 disconnects from the second terminal 200, the first terminal 100 may record an application package name of the game application and a currently paused level: Level 1. Therefore, when the first terminal 100 reconnects to the second terminal 200, still as shown in FIG. 17A and FIG. 17B, the first terminal 100 may restart the game application in the display interface of the second terminal 200 based on the recorded application package name of the game application. In addition, the first terminal 100 may further display again, in the display interface of the second terminal 200 based on the level at which the game application pauses on the second terminal 200 upon the disconnection, a system interface for entering Level 1 of Gold Miner. In this case, the game startup interface (namely, the third interface) is an interface adjacent to the game interface (namely, the first interface) of Level 1 of Gold Miner before the disconnection.

Therefore, after a user taps a "Level 1" button in the system interface of Level 1 of Gold Miner that is displayed on the second terminal 200, the second terminal 200 may be triggered to display a game interface that appears after Level 1 is entered, to resume the window of the game application on the second terminal 200 before the disconnection. In this way, the game application continues on the second terminal 200 before and after the disconnection. Certainly, the user may trigger, on the first terminal 100, the first terminal 100 to send a switch instruction to the second terminal 200. In this case, the first terminal 100 sends, to the second terminal 200, display data in the game interface (namely, the first interface) of Level 1 of Gold Miner, so that the second terminal 200 displays the game interface that appears after Level 1 is entered. This is not limited in this embodiment of this application.

Figure 18A:
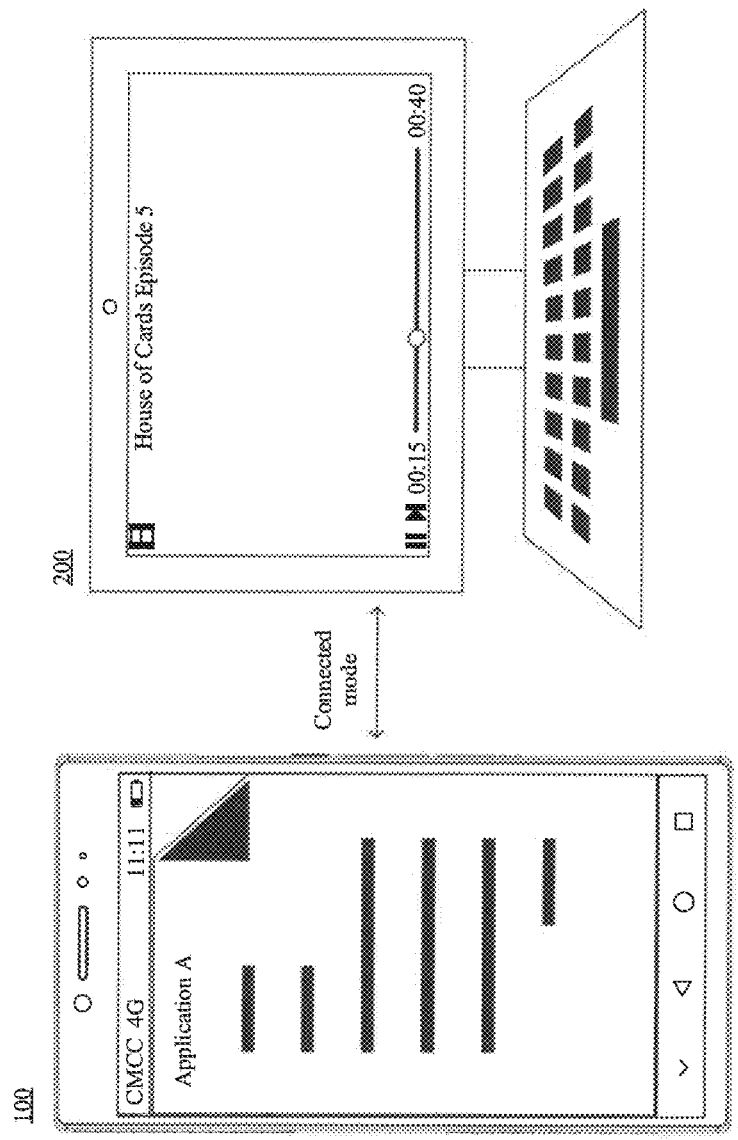
FIGS. 18A, 18B and 18C are schematic diagrams 12 of an application scenario of a display method according to an embodiment of this application.
Figure 18B:
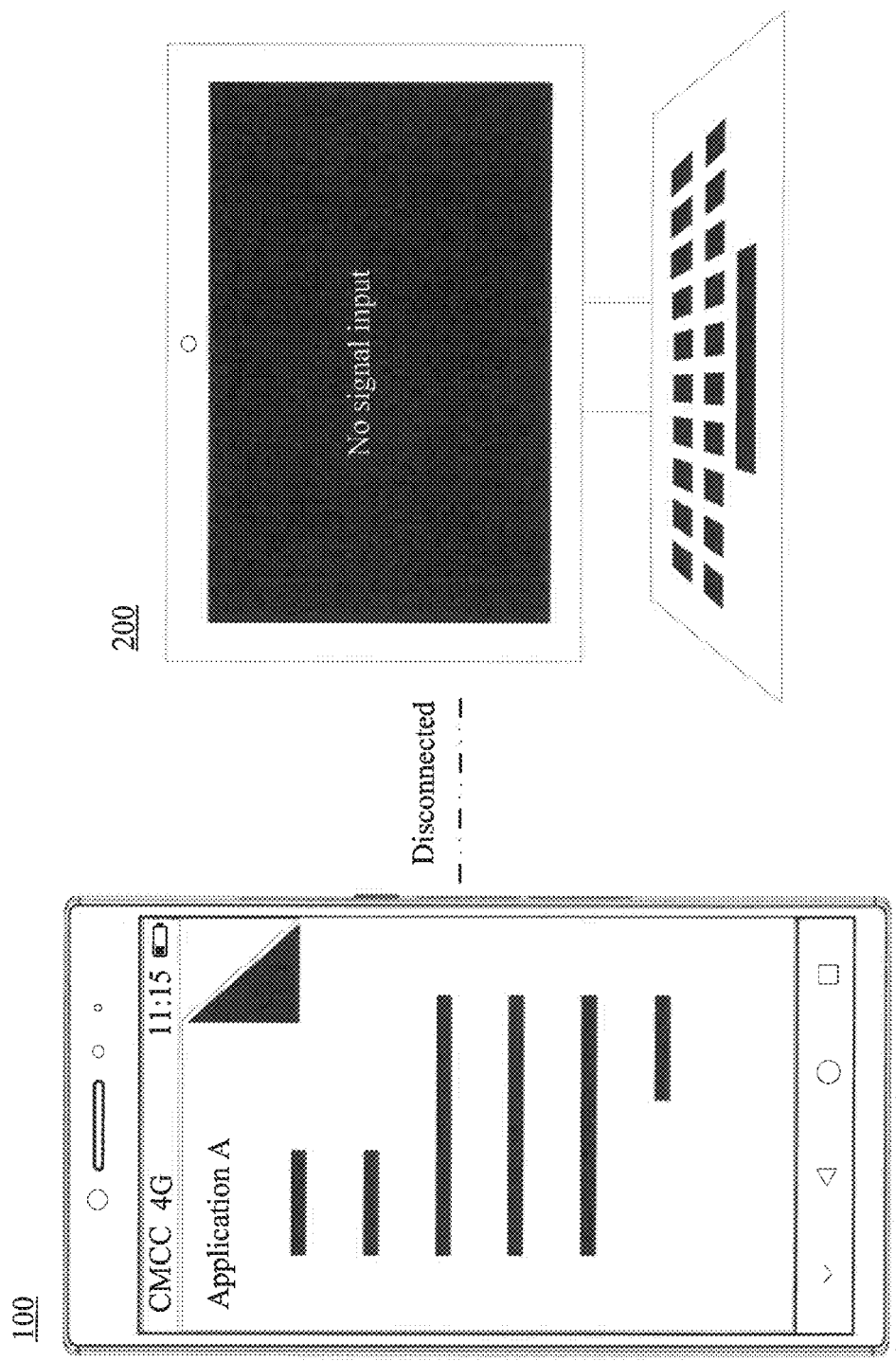
Figure 18C:
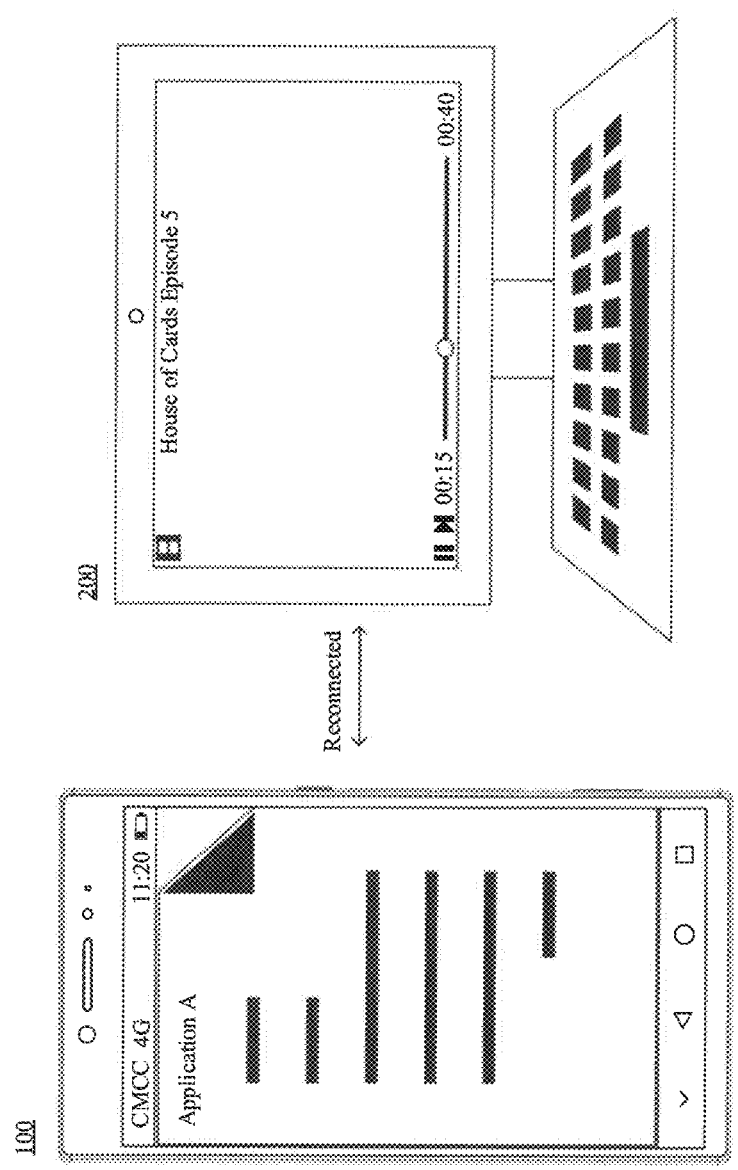

In some other embodiments of this application, the target application may be specifically a player application. As shown in FIG. 18A, after the first terminal 100 connects to the second terminal 200, a user may open an application A on the first terminal 100 to view document content, and open the player application on the second terminal 200 to watch TV series at the same time. For example, the user is watching Episode 5 of House of Cards. In this case, as shown in FIG. 18B, if the first terminal 100 disconnects from the second terminal 200, the first terminal 100 closes Episode 5 of House of Cards that is being played on the display of the second terminal 200, and the display of the second terminal 200 presents a no signal input state. In addition, when the first terminal 100 disconnects from the second terminal 200, the first terminal 100 may also record historical display data that is on the second terminal 200 at this time, for example, move, to the first application container corresponding to the first terminal 100, an application task (for example, displaying an interface at the fifteenth minute of Episode 5 of House of Cards) that is generated by the player application and that is in the second application container corresponding to the second terminal 200. Therefore, if the first terminal 100 subsequently reconnects to the second terminal 200, the first terminal 100 may recreate the second application container for the display of the second terminal 200, and move the application task back to the second application container. In this way, as shown in FIG. 18C, the first terminal 100 may continue to execute the resumed application task in the second application container, and display an execution result in the display interface of the second terminal 200, so that the interface at the fifteenth minute of Episode 5 of House of Cards is resumed in the display interface of the second terminal 200. In this way, video playback progress in the third interface is the same as video playback progress in the first interface, and the player application seamlessly continues before and after the disconnection is implemented.

In addition, before the first terminal 100 disconnects from the second terminal 200, a plurality of applications, such as a plurality of application windows, may be displayed in the first interface of the second terminal 200. Therefore, after the first terminal 100 reconnects to the second terminal 200, at least one of applications resumed in the third interface of the second terminal 200 is the same as an application in the first interface, or an application resumed in the third interface of the second terminal 200 may be a subset of applications displayed in the first interface; or an application resumed in the third interface of the second terminal 200 may be totally the same as an application displayed in the first interface. This is not limited in this embodiment of this application.

Figure 19:
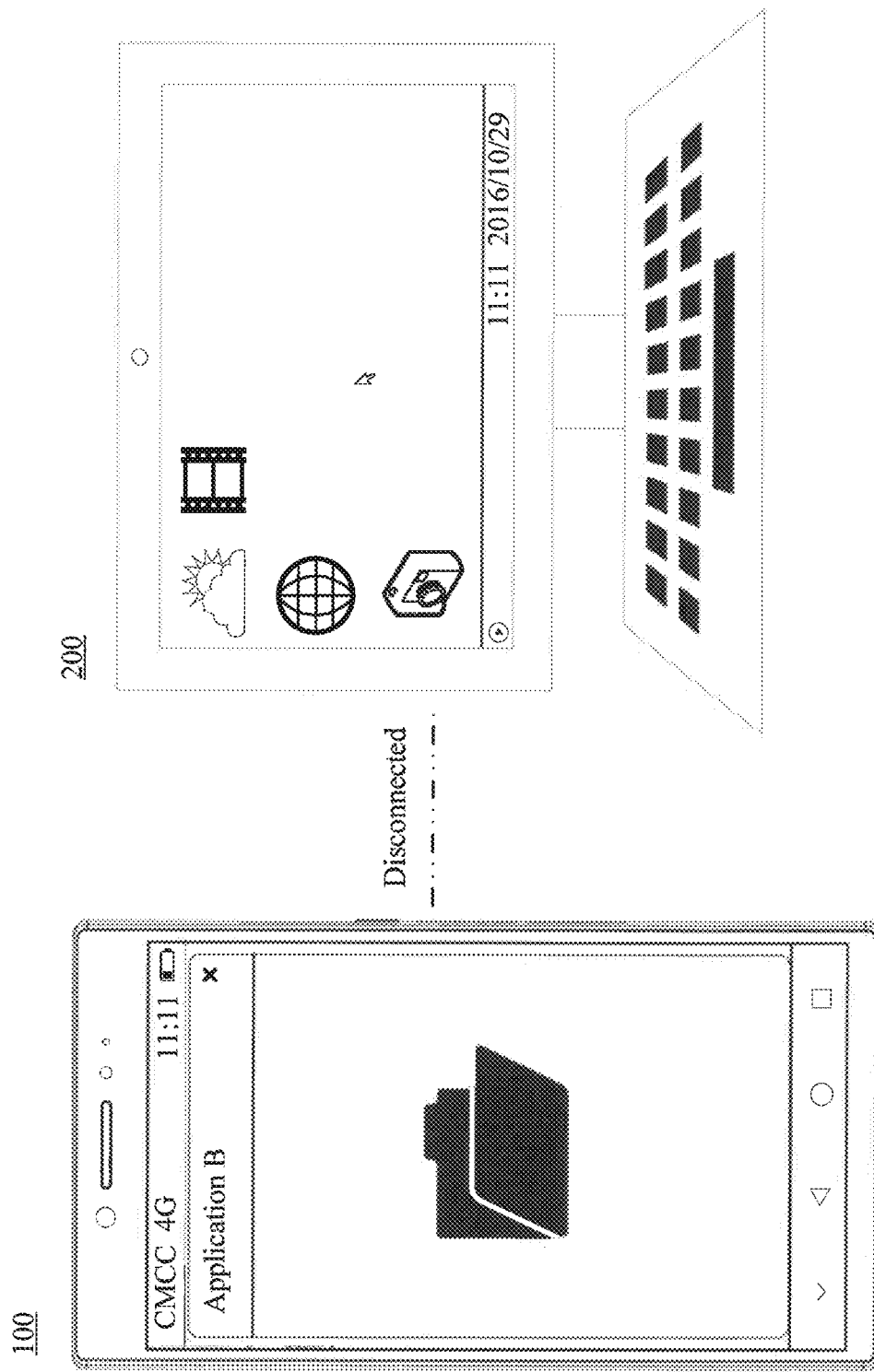
FIG. 19 is a schematic diagram 13 of an application scenario of a display method according to an embodiment of this application.

Further, as shown in FIG. 19, when the first terminal 100 disconnects from the second terminal 200, the first terminal 100 may further switch, for running, the application B running on the second terminal 200 to the display interface of the first terminal 100.

In this case, the current display interface of the first terminal 100 may be referred to as a fourth interface, and the fourth interface is also correlated with the third interface that is displayed on the second terminal 200 before the disconnection.

For example, an interface element, such as an application icon or a control, in the fourth interface displayed on the first terminal 100 is the same as an interface element in the third interface displayed on the second terminal 200, but display specification information, such as a size and a resolution, of each interface element in the fourth interface may be different from display specification information of each interface element in the third interface.

For example, Page 18 of a ** document is displayed in the third interface of the second terminal 200 before disconnection. In this case, when the first terminal 100 disconnects from the second terminal 200, the first terminal 100 may adjust a resolution of display content on Page 18 of the document to a resolution that fits the display of the first terminal 100, to continue to display Page 18 of the document on the display of the first terminal 100. For another example, a display interface at the fifteenth minute of a video A is displayed in the third interface of the second terminal 200 before disconnection. In this case, when the first terminal 100 disconnects from the second terminal 200, the first terminal 100 may adjust a resolution of the display interface at the fifteenth minute of the video A, so that the terminal can continue to display the display interface at the fifteenth minute of the video A on the display of the first terminal 100.

Figure 20:
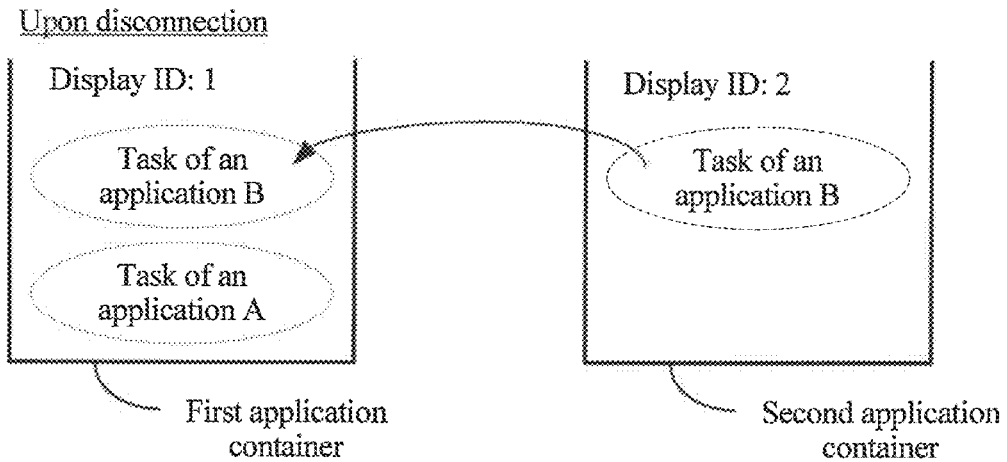
FIG. 20 is a schematic diagram 14 of an application scenario of a display method according to an embodiment of this application.

For example, as shown in FIG. 20, when the first terminal 100 disconnects from the second terminal 200, before deleting the second application container, the first terminal 100 may move an application task, of the application B, in the second application container to a stack top of the first application container. In this way, when executing a task in the first application container, the first terminal 100 first executes the application task, of the application B, that is at the stack top. In other words, the first terminal 100 continues to run the application B in the display interface of the first terminal 100, so that a user may still continue to perform, on the first terminal 100, a related function of the application B during the disconnection, thereby reducing impact, on an execution process of the application B, that is caused because the first terminal 100 disconnects from the second terminal 200.

For example, after the first terminal 100 connects to the second terminal 200, a window of a read type application is running in the display interface of the second terminal 200, and an application task currently generated in the second application container is displaying Page 18 of a  document. Therefore, when the first terminal 100 disconnects from the second terminal 200, the first terminal 100 adds the application task "displaying Page 18 of the  document"

that is in the second application container to the stack top of the first application container. In this way, after the first terminal 100 executes the application task "displaying Page 18 of the * document" that is at the stack top of the first application container, Page 18 of the ** document is displayed in the display interface of the first terminal 100, so that after the disconnection, the application running on the second terminal 200 is switched to the display interface of the first terminal 100 to continue running.

For another example, after the first terminal 100 connects to the second terminal 200, a window of a game application is running in the display interface of the second terminal 200, and an application task currently generated in the second application container is displaying a game interface of Level 6. Therefore, when the first terminal 100 disconnects from the second terminal 200, the first terminal 100 adds the application task "displaying the game interface of Level 6" that is in the second application container to the stack top of the first application container. In this way, after the first terminal 100 executes the application task "displaying the game interface of Level 6" that is at the stack top of the first application container, the game interface of Level 6 in the game application is displayed in the display interface of the first terminal 100, so that after the disconnection, the application running on the second terminal 200 is switched to the display interface of the first terminal 100 to continue running.

For another example, after the first terminal 100 connects to the second terminal 200, a window of a video application is running in the display interface of the second terminal 200, and an application task currently generated in the second application container is playing an interface at the twentieth minute of Episode 5 of House of Cards. In this case, when the first terminal 100 disconnects from the second terminal 200, the first terminal 100 adds the application task "playing the interface at the twentieth minute of Episode 5 of House of Cards" that is in the second application container to the stack top of the first application container. In this way, after the first terminal 100 executes the application task "playing the interface at the twentieth minute of Episode 5 of House of Cards" that is at the stack top of the first application container, the interface at the twentieth minute of Episode 5 of House of Cards is played in the display interface of the first terminal 100, so that after the disconnection, the application running on the second terminal 200 is switched to the display interface of the first terminal 100 to continue running.

In addition, when moving the application task, of the application B, in the second application container to the stack top of the first application container, the first terminal 100 may adjust the application task, of the application B, in the second application container based on specification information such as a resolution and DPI of the display of the second terminal 200, so that the application task meets the specification information of the display of the second terminal 200.

For another example, a resolution of the first terminal 100 is A, and a resolution of the second terminal 200 is B. A common player application usually supports displays with a plurality of resolutions (for example, when the application B is launched in an application market, the application B supports a display with the resolution A and a display with the resolution B). Therefore, when the first terminal 100 disconnects from the second terminal 200, the first terminal 100 may change a resolution parameter of the application B to B, and then move the application task, of the application B, in the second application container to the stack top of the first application container, so that a user can watch, on the display of the second terminal 200, display content that matches the resolution of the display of the second terminal 200, thereby improving a user experience.

It may be understood that to implement the foregoing functions, the foregoing terminal and the like include a corresponding hardware structure and/or software module for performing each of the functions. A person skilled in the art should be easily aware that the units and algorithm steps in the examples described with reference to the embodiments disclosed in this specification may be implemented by hardware or a combination of hardware and computer software in the embodiments of this application. Whether a function is performed by hardware or computer software driving hardware depends on a particular application and a design constraint condition of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method example. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in an actual implementation.

Figure 21:
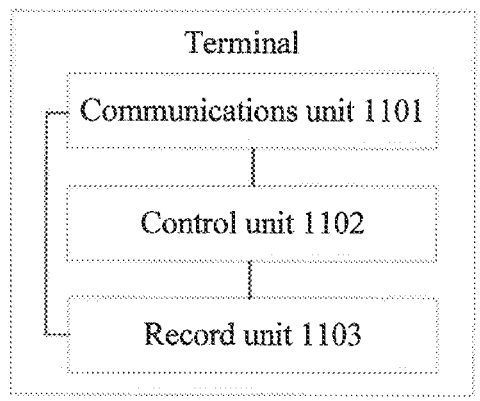
FIG. 21 is a schematic structural diagram 1 of a terminal according to an embodiment of this application.

When each function module is obtained through division based on a corresponding function, FIG. 21 is a possible schematic structural diagram of a terminal (for example, the first terminal or the second terminal) in the foregoing embodiment. The terminal includes a communications unit 1101, a control unit 1102, and a record unit 1103.

The communications unit 1101 is configured to support the terminal in performing processes 501 and 505 in FIG. 6. The control unit 1102 is configured to support the terminal in performing processes 502 and 504 in FIG. 6. The record unit 1103 is configured to support the terminal in performing the process 503 in FIG. 6. All related content of each step in the foregoing method embodiments may be cited in function descriptions of a corresponding function module. Details are not described herein again.

Figure 22:
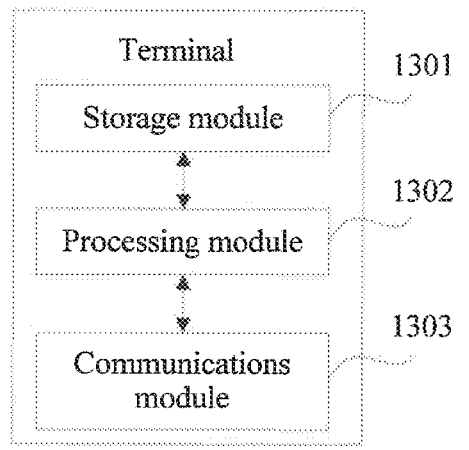
FIG. 22 is a schematic structural diagram 2 of a terminal according to an embodiment of this application.

When an integrated unit is used, FIG. 22 is a possible schematic structural diagram of a terminal (for example, the first terminal or the second terminal) in the foregoing embodiment. The terminal includes a processing module 1302 and a communications module 1303. The processing module 1302 is configured to control and manage an action of the terminal. The communications module 1303 is configured to support communication between the terminal and another network entity. The terminal may further include a storage module 1301 that is configured to store program code and data of the terminal.

The processing module 1302 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1302 may implement or execute various examples of logical blocks, modules, and circuits that are described with reference to the content disclosed in this application. The processor may also be a combination implementing a computing function, for example, a combination including one or more microprocessors or a combination of a DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and the storage module 1301 is a memory, the terminal provided in this embodiment of this application may be the mobile phone 300 shown in FIG. 5.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, that integrates one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display method, comprising:
sending, by a first terminal, first display data to a second terminal after the first terminal connects to the second terminal, so that the second terminal displays a first interface, wherein the first terminal displays a second interface, and the first interface is different from the second interface;
recording, by the first terminal, historical display data when the first terminal disconnects from the second terminal, wherein the historical display data is capable of indicating display content that is on the second terminal when the first terminal disconnects from the second terminal; and
sending, by the first terminal, second display data to the second terminal according to the historical display data after the first terminal reconnects to the second terminal, so that the second terminal displays a third interface, wherein the third interface is correlated with the first interface.

2. The method according to claim 1, wherein the third interface is correlated with the first interface such that:
an application displayed in the third interface is the same as an application displayed in the first interface.

3. The method according to claim 2, wherein the same application is any one of a video application, a text application, an instant messaging application, or a game application.

4. The method according to claim 1, wherein
a display location of a target application in the third interface is the same as a display location of the target application in the first interface, and the target application is a running application displayed in both the first interface and the third interface.

5. The method according to claim 1, wherein after the disconnecting, by the first terminal, from the second terminal, the method further comprises:
stopping, by the first terminal, sending the first display data to the second terminal; and
displaying, by the first terminal, a fourth interface correlated with the third interface.

6. The method according to claim 5, wherein an interface element in the fourth interface is the same as an interface element in the third interface.

7. The method according to claim 1, wherein the third interface is correlated with the first interface such that:
an interface displayed in the third interface is the same as an interface displayed in the first interface.

8. The method according to claim 7, wherein the interface displayed in the third interface is the same as an interface displayed in the first interface such that:
video playback progress displayed in the third interface is the same as video playback progress displayed in the first interface; or
document content displayed in the third interface is the same as document content displayed in the first interface; or
a chat record in a chat window in the third interface is the same as a chat record in a chat window in the first interface; or
a game system interface displayed in the third interface is the same as a game system interface displayed in the first interface.

9. The method according to claim 8, wherein the chat record comprises an unsent chat draft in an input box.

10. The method according to claim 1, wherein the third interface is correlated with the first interface such that:
an interface displayed in the third interface and an interface displayed in the first interface are adjacent interfaces of one application.

11. The method according to claim 10, wherein when the interface displayed in the third interface and the interface displayed in the first interface are adjacent interfaces of one application, the method further comprises:
sending, by the first terminal, third display data to the second terminal in response to an operation triggered by a user, so that the second terminal switches from the third interface to the first interface.

12. A terminal, comprising a processor, a memory, and a communications interface, wherein the communications interface is configured to send first display data to another terminal after the terminal connects to the another terminal, so that the another terminal displays a first interface, wherein the terminal displays a second interface, and the first interface is different from the second interface;

the processor is configured to record historical display data when the terminal disconnects from the another terminal, wherein the historical display data is capable of indicating display content that is on the another terminal when the terminal disconnects from the another terminal; and the communications interface is further configured to send second display data to the another terminal after the terminal reconnects to the another terminal, so that the another terminal displays a third interface, wherein the third interface is correlated with the first interface.

13. The terminal according to claim 12, wherein the third interface is correlated with the first interface such that:

an application displayed in the third interface is the same as an application displayed in the first interface; or an interface displayed in the third interface is the same as an interface displayed in the first interface; or an interface displayed in the third interface and an interface displayed in the first interface are adjacent interfaces of one application.

14. The terminal according to claim 13, wherein when the application displayed in the third interface is the same as the application displayed in the first interface, and the same application is any one of a video application, a text application, an instant messaging application, or a game application.

15. The terminal according to claim 13, wherein the interface displayed in the third interface is the same as an interface displayed in the first interface such that:

video playback progress displayed in the third interface is the same as video playback progress displayed in the first interface; or document content displayed in the third interface is the same as document content displayed in the first interface; or a chat record in a chat window in the third interface is the same as a chat record in a chat window in the first interface; or a game system interface displayed in the third interface is the same as a game system interface displayed in the first interface.

16. The terminal according to claim 15, wherein the chat record comprises an unsent chat draft in an input box.

17. The terminal according to claim 13, wherein when the interface displayed in the third interface and the interface displayed in the first interface are adjacent interfaces of one application;

the communications interface is further configured to send third display data to the another terminal, so that the another terminal switches from the third interface to the first interface.

18. The terminal according to claim 12, wherein a display location of a target application in the third interface is the same as a display location of the target application in the first interface, and the target application is a running application displayed in both the first interface and the third interface.

19. The terminal according to claim 12, wherein the terminal further comprises a display;

the processor is further configured to stop sending the first display data to the another terminal by using the communications interface; and the display is configured to display a fourth interface correlated with the third interface.

20. The terminal according to claim 19, wherein an interface element in the fourth interface is the same as an interface element in the third interface.

21. A non-transitory computer readable storage medium, wherein the non-transitory computer readable storage medium stores an instruction, and when the instruction runs on a terminal, the terminal performs the display method according to claim 1.

* * * * *